US007019507B1

(12) United States Patent
Dittmer et al.

(10) Patent No.: US 7,019,507 B1
(45) Date of Patent: Mar. 28, 2006

(54) METHODS AND CIRCUITS FOR PROGRAMMABLE CURRENT LIMIT PROTECTION

(75) Inventors: Gregory P. Dittmer, San Jose, CA (US); Talbott M. Houk, Monte Sereno, CA (US)

(73) Assignee: Linear Technology Corporation, Milpitas, CA (US)

( * ) Notice: Subject to any disclaimer, the term of this patent is extended or adjusted under 35 U.S.C. 154(b) by 162 days.

(21) Appl. No.: 10/722,808

(22) Filed: Nov. 26, 2003

(51) Int. Cl.
*G05F 1/56* (2006.01)

(52) U.S. Cl. ..................................... 323/284; 323/271
(58) Field of Classification Search ................ 323/271, 323/282, 284
See application file for complete search history.

(56) References Cited

U.S. PATENT DOCUMENTS

| | | | |
|---|---|---|---|
| 3,458,798 A | 7/1969 | Fang et al. | |
| 3,571,697 A | 3/1971 | Phillips | |
| 3,579,091 A | 5/1971 | Clarke et al. | |
| 3,581,186 A | 5/1971 | Weinberger | |
| 3,582,758 A | 6/1971 | Gunn | |
| 3,585,491 A | 6/1971 | Peterson | |
| 3,733,540 A | 5/1973 | Hawkins | |
| 3,772,588 A | 11/1973 | Kelly et al. | |
| 3,784,893 A | 1/1974 | Rando | |
| 3,863,128 A | 1/1975 | Wilwerding | |
| 3,879,647 A | 4/1975 | Hamilton et al. | |
| 3,992,638 A | 11/1976 | Sauvanet | |
| 4,013,939 A | 3/1977 | Biess et al. | |
| 4,035,710 A | 7/1977 | Joyce | |
| 4,071,884 A | 1/1978 | Maigret | |
| 4,160,288 A | 7/1979 | Stuart et al. | |
| 4,326,245 A | 4/1982 | Saleh | |
| 4,395,675 A | 7/1983 | Toumani | |
| 4,428,015 A | 1/1984 | Nesler | |
| 4,462,069 A | 7/1984 | Becky | |
| 4,479,174 A | 10/1984 | Cates | |
| 4,493,017 A | 1/1985 | Kammiller et al. | |
| 4,519,024 A | 5/1985 | Federico et al. | |
| 4,541,041 A | 9/1985 | Park et al. | |
| 4,554,499 A | 11/1985 | Sherman et al. | |
| 4,578,630 A | 3/1986 | Grosch | |
| 4,610,521 A | 9/1986 | Inoue | |
| 4,634,956 A | 1/1987 | Davis et al. | |
| 4,672,303 A | 6/1987 | Newton | |
| 4,672,518 A | 6/1987 | Murdock | |
| 4,674,020 A | 6/1987 | Hill | |
| 4,683,529 A | 7/1987 | Bucher, II | |

(Continued)

FOREIGN PATENT DOCUMENTS

EP          0 428 377 A2     5/1991

(Continued)

OTHER PUBLICATIONS

Analog Devices, Inc., "High Efficiency Synchronous Step-Down Switching Regulators ADP1148, ADP1148-3.3, ADP1148-5," Datasheet, pp. 1-14, 1997.

(Continued)

*Primary Examiner*—Jeffrey Sterrett
(74) *Attorney, Agent, or Firm*—Fish & Neave IP Group Ropes & Gray LLP; Mark D. Rowland; Chi-Hsin Chang

(57) ABSTRACT

The present invention provides methods and circuits for protecting power converters from over-current conditions that, in one embodiment, (1) reduce average inductor current to a steady-state threshold during a transient phase and regulate average inductor current in steady-state regulation approximately at the steady-state threshold; and (2) reduce instantaneous inductor current after the instantaneous inductor current exceeds a maximum instantaneous threshold during the transient phase.

42 Claims, 9 Drawing Sheets

U.S. PATENT DOCUMENTS

| | | | |
|---|---|---|---|
| 4,709,315 | A | 11/1987 | Ramos |
| 4,712,169 | A | 12/1987 | Albach |
| 4,716,514 | A | 12/1987 | Patel |
| 4,727,308 | A | 2/1988 | Huljak et al. |
| 4,754,385 | A | 6/1988 | McDade et al. |
| 4,801,859 | A | 1/1989 | Dishner |
| 4,813,066 | A | 3/1989 | Holtz et al. |
| 4,814,684 | A | 3/1989 | McCurdy |
| 4,819,122 | A | 4/1989 | Gontowski, Jr. |
| 4,823,070 | A | 4/1989 | Nelson |
| 4,843,532 | A | 6/1989 | Freedman |
| 4,851,953 | A | 7/1989 | O'Neill et al. |
| 4,866,587 | A | 9/1989 | Wadlington |
| 4,870,555 | A | 9/1989 | White |
| 4,884,183 | A | 11/1989 | Sable |
| 4,902,957 | A | 2/1990 | Cassani et al. |
| 4,922,404 | A | 5/1990 | Ludwig et al. |
| 4,928,200 | A | 5/1990 | Redl et al. |
| 4,929,882 | A | 5/1990 | Szepesi |
| 4,931,716 | A | 6/1990 | Jovanovic et al. |
| 4,996,638 | A | 2/1991 | Orr |
| 5,028,861 | A | 7/1991 | Pace et al. |
| 5,034,871 | A | 7/1991 | Okamoto et al. |
| 5,055,767 | A | 10/1991 | Nelson |
| 5,066,900 | A | 11/1991 | Bassett |
| 5,068,575 | A | 11/1991 | Dunsmore et al. |
| 5,081,411 | A | 1/1992 | Walker |
| 5,097,196 | A | 3/1992 | Schoneman |
| 5,128,603 | A | 7/1992 | Wölfel |
| 5,134,355 | A | 7/1992 | Hastings |
| 5,138,249 | A | 8/1992 | Capel |
| 5,144,547 | A | 9/1992 | Masamoto |
| 5,170,333 | A | 12/1992 | Niwayama |
| 5,177,676 | A | 1/1993 | Inam et al. |
| 5,179,511 | A | 1/1993 | Troyk et al. |
| 5,184,129 | A | 2/1993 | Fung et al. |
| 5,193,211 | A | 3/1993 | Nobusawa |
| 5,237,606 | A | 8/1993 | Ziermann |
| 5,309,078 | A | 5/1994 | Cameron |
| 5,396,412 | A | 3/1995 | Barlage |
| 5,408,162 | A | 4/1995 | Williams |
| 5,481,178 | A | 1/1996 | Wilcox et al. |
| 5,548,189 | A | 8/1996 | Williams |
| 5,612,860 | A * | 3/1997 | Meszlenyi ............. 363/49 |
| 5,731,694 | A | 3/1998 | Wilcox et al. |
| 5,847,554 | A | 12/1998 | Wilcox et al. |
| 5,955,872 | A * | 9/1999 | Grimm ............. 323/283 |
| 5,994,885 | A | 11/1999 | Wilcox et al. |
| 6,304,066 | B1 | 10/2001 | Wilcox et al. |
| 6,580,258 | B1 | 6/2003 | Wilcox et al. |

FOREIGN PATENT DOCUMENTS

| | | |
|---|---|---|
| JP | 60-32565 | 2/1985 |
| JP | 60-156269 | 8/1985 |
| JP | 63-307510 | 12/1988 |
| JP | 3-113986 | 11/1991 |
| JP | 4-42771 | 2/1992 |
| JP | 4-49844 | 2/1992 |
| JP | 4-101286 | 9/1992 |
| JP | 4-128086 | 11/1992 |

OTHER PUBLICATIONS

Archer, William R., "Current-Driven Synchronous Rectifier," Motorola TMOS Power FET Design Ideas, BR316, pp. 9-10, 1985.

Archer, William R., "Current Drives Synchronous Rectifier," EDN, p. 279, Nov. 28, 1985.

Blanchard, Richard, et al., "MOSFETs, Schottky Diodes Vie for Low-Voltage-Supply Designs," EDN, p. 197, Jun. 28, 1984.

Brown, Marty, "Practical Switching Power Supply Design," pp. 20-34, Academic Press, Inc., 199.

Business Wire, "Micro Linear announces first single-chip power controller for notebook computers," Apr. 16, 1992.

Cassani, John C. et al., "Sophisticated Control IC Enhances 1MHz Current Controlled Regulator Performance," Proceedings of HFPC, May 1992, pp. 167-173.

Chetty, P.R., "DC timers control dc-dc converters" Electronics, pp. 121 & 123, Nov. 13, 1975.

Chryssis, George, "High-frequency switching power supplies," pp. 144-152 and 180-181, McGraw-Hill, 1989.

Dell Computer Corporation, "Dell Computer Corporation Introduces Advanced Notebook PC," (alleged to contain UC1895, see Unitrode Advance Information Datasheet Oct. 5, 1992), Sep. 1991.

Dinsmore, D., "Dual regulator handles two input voltages," EDN, Jan. 21, 1993.

Fisher, R. A. et al., "Performance of Low Loss Synchronous Rectifiers in a Series-Parallel Resonant DC-DC Converter," Proceedings of the Fourth Annual IEEE Applied Power Electronics Conference and Exposition, pp. 240-246, Mar. 1989.

Gauen, Kim, "Synchronous Rectifier Improves Step-Down Converter Efficiency," PCIM, pp. 8, 11-12 & 14-15, Apr. 1993.

Goodenough, F., "Dozing IC Op Amps Wake Up For Input Signal," Electronic Design, Dec. 5, 1991.

Goodenough, Frank, "Synchronous Rectifier UPS PC Battery Life," Electronic Design, pp. 47-53, Apr. 16, 1992.

Goodenough, Frank, "Low-Voltage Analog ICs Wait in the Wings," Electronic Design, Sep. 3, 1992.

Goodenough, F., "Raise Switcher Efficiency Above 90%", Electronic Design, Jan. 21, 1993.

Gottlieb, I. M., "Practical Power-Control Techniques," Howard W. Sams & Co., pp. 116-120, 1987.

Gottlieb, I. M., Electronic Power Control, TAB Books, pp. 107-111, 1991.

Gracie, Paul D., "Intermittent Converter Saves Power," EDN, p. 151, Sep. 1, 1989.

Graf, Rudolf F., "Modern Dictionary of Electronics," 6th Edition, pp. 402-403, 1984.

Grant, Duncan A. et al., "Power MOSFETS, Theory and Application," pp. 239-256, Wiley-Interscience, 1989.

Harris Semiconductor, Hodgins et al., "HIP 5060 Family of Current Mode Control ICs Enhance 1 MHZ Regulator Performance," Application Note AN9212.1, pp. 11-191 to 11-197, 1992.

Harris Semiconductor, "HIP 5060 Power Control IC Single Chip Power Supply", Datasheet, Apr. 1994.

Harris Semiconductor, "HIP 5060 Power Control IC Single Chip Power Supply", Preliminary Datasheet, Jan. 1992.

Harris Semiconductor, "HIP 5060 Power Control IC Single Chip Power Supply", Datasheet, May 1992.

Hewett, S., "Improved Switched Mode Power Supply Regulation by Eliminating Turn-off Spikes," IBM Technical Disclosure Bulletin, vol. 31, No. 4, pp. 97-98, Sep. 1988.

Hnatek, Eugene R., "Design of Solid State Power Supplies," Third Edition, pp. 65-70, Van Nostrand Reinhold, 1989.

Horowitz & Hill, "The Art of Electronics," pp. 356-359, Cambridge University Press, 1989.

Huffman, B., "Efficiency and Power Characteristics of Switching Regulator Circuits," Application Note 46, Linear Technology, Nov. 1991.

Ikeda, S. et al., "Power MOSFET for Switching Regulator," International Telecommunications Energy Conference, Oct. 1982.

Impala Linear, "ILC6311 Synchronous 3A Switching Regulator With Auto-Light Load Mode," Preliminary Datasheet, pp. 30-38, Jan. 1997.

Impala Linear, "ILC6350 Dual Output Synchronous Step-Down DC-DC Controller," Advanced Information Prelimunary Datasheet, pp. 1-6, Jan. 1997.

Impala Linear, "ILC6310 Synchronous Step-down DC-DC Converter With Auto Light-Load Mode Select," Final Datasheet, pp. 21-38, Jun. 1996.

Impala Linear, "ILC6330 13A Adjustable Synchronous DC-DC Controller," Preliminary Datasheet, pp. 39-41, Jun. 1996.

International Rectifier, "IR Application Note AN-978, HV Floating MOS-Gate Driver ICs, A Typical Block Diagram," Application Note from web page, date unknown.

International Rectifier, Clemente et al., "HV Floating MOS-Gate Driver IC," Application Note AN-978A, 1990.

Kassakian, J. et al., "Principles of Power Electronics," pp. 103-165, Addison-Wesley Publishing Company, 1991.

Kerridge, Brian, "Battery power breeds efficient regulators," EDN, pp. 103-108, Mar. 18, 1993.

Lee, Y. S. and Cheng, Y. C., "A 580 kHz switching regulator using on-off control," Journal of the Institution of Electronic and Radio Engineers, vol. 57, No. 5, pp. 221-226, Sep. 1987.

Lee, et al., "Design of Switching Regulator with Combined FM and On-Off Control," IEEE Transactions on Aerospace and Electronic Systems, vol. AES-22, No. 6, pp. 725-731, 11/8.

Linear Technology, "LT1074 Switching Regulator," Preliminary Datasheet, Jun. 1989.

Linear Technology, "LT1072 1.25A High Efficiency Switching Regulator," Datasheet, 1990.

Linear Technology, "New Device Cameos," Linear Technology Magazine, 10:18-19 1992.

Linear Technology, "LTC1148/LTC1148-3.3/LTC1148-5 High Efficiency Synchronous Stepdown Switching Regulator," Preliminary Datasheet, Nov. 1992.

Linear Technology, Williams, J., Application Note 29, "Some Thoughts on DC-DC Converters," 1990 Linear Applications Handbook, pp. AN29-1 to AN29-44, Oct. 1988.

Linear Technology, "LT1524/LT3524 Regulating Pulse Width Modulator," 1990.

Linear Technology, "LT1170/LT1171/LT1172 100kHz 5A, 2.5A, 1.25A High Efficiency Switching Regulators," Data Sheet, 1991.

Linear Technology, "LT1271/LT1269 4A High Efficiency Switching Regulators," Data Sheet, 1992.

Linear Technology, Pietkiewicz et al., "DC-DC Converters for Portable Computers," Design Note 52, 1991.

Linear Technology, Williams, J., App. Note 25, "Switching Regulators for Poets," Sep. 1987.

Linear Technology, "LT1846/1847, LT3846/3847 Current Mode PWM Controller," Datasheet, 1990.

Linear Technology, "LTC1735 High Efficiency Synchronous Step-Down Switching Regulator," Datasheet, 1998.

Linear Technology, "LTC1736 5-Bit Adjustable High Efficiency Synchronous Step-Down Switching Regulator," Datasheet, 1999.

Linear Technology, Williams, J., Application Note 35, "Step Down Switching Regulators," 1990 Linear Applications Handbook, pp. AN35-1 to AN35-32, Aug. 1989.

Linear Technology, "LTC1436A/LTC1436A-PLL/LTC1437A High Efficiency Low Noise Synchronous Step-Down Switching Regulators," Datasheet, 1996.

Linear Technology, "LTC1438/LTC1439 Dual High Efficiency, Low Noise, Synchronous Step-Down Switching Regulators," Datasheet, 1997.

Linear Technology, Pietkiewicz, S., "A Low-Voltage, Micro-Power 1 Amp Switching Regulator," presented at the International Solid State Circuits Conference, 1990.

Linear Technology, LT1073 Micropower DC-DC Converter Adjustable and Fixed 5V, 12V, Datasheet, 1991.

Linear Technology, "LTC1538-AUX/LTC1539 Dual High Efficiency, Low Noise, Synchronous, Step-Down Switching Regulators," Datasheet, 199.

Linear Technology, "LTC1142/LTC1142L/LTC1142HV Dual High Efficiency Synchronous Step-Down Switching Regulators," Datasheet, 1995.

Linear Technology, "LTC1149/LTC1149-3.3/LTC1149-5 High Efficiency Synchronous Step-Down Switching Regulators," Datasheet, 1993.

Linear Technology, "LTC1159/LTC1159-3.3/LTC1159-5 High Efficiency Synchronous Step-Down Switching Regulators," Datasheet, 1994.

Linear Technology, "LTC1435 High Efficiency Low Noise Synchronous Step-Down Switching Regulator," Datasheet, 1996.

Linear Technology, "LTC1267/LTC1267-ADJ/LTC1267-ADJ5 Dual High Efficiency Synchronous Step-Down Switching Regulators," Datasheet, 1995.

Linear Technology, "LTC1266/LTC1266-3.3/LTC1266-5 Synchronous Regulator Controller for NB or P-Channels MOSFETs," Datasheet, 1995.

Markus, John, "Guidebook of Electronic Circuits," pp. 647 & 649, 1971.

Maxim Integrated Products, Inc., "MAX638 Fixed +5V CMOS Step-Down Switching Regulator," Maxim 1989 Integrated Circuits Data Book, pp. 6-57 to 6-64, 1989.

Maxim Integrated Products, Inc., "MAX782/MAX786 Notebook Computer Power Supplies," Advance Information Data Sheet, Feb. 1993, pp.1-8.

Maxim Integrated Products, "MAX1630-MAX1635 Multi-Output, Low-Noise Power Supply Controllers for Notebook Computers," Datasheet Rev. 3; Apr. 1997.

Maxim Integrated Products, "MAX798 High-Accuracy Step-Down Controller With Synchronous Rectifier for CPU Power," Datasheet, Dec. 1996.

Maxim Integrated Products,"MAX796/MAX797/MAX799 Step-Down Controllers With Synchronous Rectifier for CPU Power," Datasheet Rev. 3a; Nov. 1997.

Maxim Integrated Products, Inc., MAX782, Addendum to Advance Information Sheet and EV Kit Document, bearing Bates numbers L07760-007785, contains dates in Feb. 1993 and Mar. 1993 (MAX782 Advance Information Data Sheet cited above).

Maxim Integrated Products, Inc., "MAX635/636/637 Preset/Adjustable Output CMOS Inverting Switching Regulators," Datasheet, Date Unknown.

Maxim Integrated Products, "MAX782 Triple-Output Power-Supply Controller for Notebook Computers," Datasheet Rev. 2; May 1994.

Maxim Integrated Products, Inc., "MAX746 High-Efficiency, PWM, Step-Down, N-Channel DC-DC Controller," Datasheet, Nov. 1993.

Maxim Integrated Products, Inc., "MAX747 High-Efficiency PWM, Step-Down P-Channel DC-DC Controller," Datasheet, Sep. 1993.

Maxim Integrated Products, Inc., "MAX777L/MAX778L/MAX779L Low-Voltage Input, 3V/3.3V/5V/ Adjustable Output, Step-Up DC-DC Converters," Datasheet, Jul. 1996.

Maxim Integrated Products, "MAX767 5V-to-3.3V, Synchronous, Step-Down Power-Supply Controller," Datasheet Rev. 2; Aug. 1994.

Meakin, Mike, "The LM3578 Switching Power Regulator," Electronic Engineering, pp. 47-52, Jul. 1986.

Micro Linear Corporation, "ML 4822 DC/DC Converter Controller for Portable Computers," Datasheet Aug. 1991.

Micro Linear Corporation, "ML4862 EVAL User's Guide," Jun. 1992.

Micro Linear Corporation, "ML4873 Battery Power Control IC," Datasheet, Jan. 1997 (preliminary version Mar. 1993—cited below).

Micro Linear Corporation, "ML4862 Battery Power Control IC," Datasheet, Mar. 1997.

Micro Linear Corporation, "ML4862 Battery Power Control IC," Advance Information Datasheet, Jul. 1992.

Micro Linear Corporation, "ML4860 Battery to DC Power Control IC for Portable Systems," Advanced Information, Feb. 1992.

Myers, R. and Peck, R., "200-kHz Power FET Technology in New Modular Power Supplies," Hewlett-Packard Journal, Aug. 1981.

NASA Jet Propulsion Laboratory,* "Synchronous Half-Wave Rectifier," Jul. 1989.

National Semiconductor Corporation, "LM1578/LM2578/LM3578 Switching Regulator," Preliminary Datasheet, 1987.

Patel, Raoji, "Using Bipolar Synchronous Rectifiers Improves Power Supply Efficiency," Proceedings of the Power Sources Conference, Nov. 1984.

Patel, R., "Bipolar synchronous rectifiers cut supply losses," EDN, Apr. 4, 1985.

Quinnell, Richard A., "Analog IC Combines Five Functions for Battery Power Management," EDN, Apr. 23, 1992.

Redl et al., "Frequency Stabilization and Synchronization of Free-Running Current-Mode Controlled Converters," PESC '86 Record, pp. 519-530, 1986.

Rippel, W.E., "Synchronous Half-Wave Rectifier," NASA Jet Propulsion Laboratory Technical Support Package vol. 13, No. 7, Item #15, Jul. 1989.

Sakai, E. and Harada, K., "A New Synchronous Rectifier Using Bipolar Transistor Driven by Current Transformer," Fourteenth International Telecommunications Energy Conference, pp. 424-429, Oct. 1992.

Sakai, E. and Harada, K., "Synchronous Rectifier Using a Bipolar Transistor Driven by Current Transformer," Journal of the Society of Electronic Data Communication, vol. J-74-B-I, No. 8, pp. 639-646, Aug. 1991 (in Japanese, with translation).

Savant, C.J., Jr., et al., "Electronic Design: Circuits and Systems," pp. 612-613, The Benjamin/Cummings Publishing Co., 1991.

Shepard, J., "Powering portable systems," EDN, Nov. 5, 1992.

Siliconix, "Si91XX Synchronous Buck Controller," Objective Specification, Dec. 20, 1990.

Siliconix, "Siliconix Si9110/Si9111," Datasheet, Oct. 1987.

Siliconix, "Synchronous Rectification," Design Ideas, Oct. 1980.

Siliconix, "Si9150 Synchronous Buck Regulator Controller, S-42677, Rev. D," Datasheet, Feb. 14, 1995.

Siliconix, "High-Efficiency Buck Converter for Notebook Computers," Application Note AN92-4, Date Unknown.

Siliconix, "Designing DC/DC Converters with the Si9110 Switchmode Controller," Siliconix Power Products Data Book, 1991.

Siliconix, "Si9150CY/BCY Synchronous Buck Converter Controller," Preliminary Data Sheet, Oct. 8, 1992.

Siliconix, "Si9150 Synchronous Buck Converter Controller," Objective Specification, handwritten pp. 7-17, Sep. 10, 1991.

Siliconix, Si9150 documents bearing Bates Nos. U040269-71, 9104.

Soclof, Sidney, "Applications of Analog Integrated Circuits," Figure 2.25, pp. 74-75, Prentice-Hall, Inc. 1985.

Sokal et al., "Control Algorithms and Circuit Designs For Optimally Flyback-Charging an Energy-Storage Capacitor," IEEE Fifth Applied Power Electronics Conference, pp. 295-301, 1990.

Steigerwald, R., "High-Frequency Resonant Transistor DC-DC Converters," IEEE Transactions on Industrial Electronics, vol. IE-31, No. 2, pp. 181-191, May 1984.

Taylor, "Flyback Converter," Electronic Engineering, p. 23, Jul. 1976.

Toyoda, "SB3012P Step Down DC-DC Converter Controller," Datasheet, Mar. 1997.

Toyoda, "SB3030P Step Down DC-DC Converter Controller," Datasheet, Dec. 1996.

Toyoda, "SB3011P Step Down DC-DC Converter Controller," Datasheet, Mar. 1997.

Toyoda, "SB3052P Dual Channel Step Down DC-DC Converter Controller," Datasheet, Feb. 1998.

Toyoda, "SB3020P Dual Channel Step Down DC-DC Converter Controller," Datasheet, Mar. 1997.

Toyoda, "SB3010P Snychronous Stepdown DC-DC Converter Controller," Datasheet Aug. 10, 1995.

Toyoda, "SB3013P Step Down DC-DC Converter Controller," Datasheet, Mar. 1997.

Toyoda, "SB3050P Dual Channel Step Down DC-DC Converter Controller," Datasheet, Mar. 1997.

Toyoda, "SB3031P Step Down DC-DC Converter Controller," Datasheet, Dec. 1996.

Unitrode, "Using Bipolar Synchronous Rectifiers Improves Power Supply Efficiency," Application Note U-103, 1989-1990 Unitrode Semiconductor Databook and Application Notes, pp. 12-88 to 12-94, Jun. 1985.

Unitrode, "UC1846/7, UC2846/7, UC3846/7 Current Mode PWM Controller," Datasheet, Jan. 1997.

Unitrode, "UC1874-1,-2, UC2874-1,-2, UC3874-1,-2 High Efficiency, Synchronous Step-Down (Buck) Controllers," Datasheet, Feb. 1998.

Unitrode, "UC1895, UC2895, UC3895 Synchronous Rectifier Buck PWM Controller," Advance Information Datasheet, Oct. 6, 1992.

Unitrode, "UC1870-1/-2, UC2870-1/-2, UC3870-1/-2 High Efficiency, Synchronous, Step-Down (Buck) Controllers," Datasheet, Aug. 1998.

Unitrode, "UCC3941-3/-5/-ADJ 1V Synchronous Boost Converter," Preliminary Datasheet, Mar. 1997.

Unitrode, "UCC19411/2/3, UCC29411/2/3, UCC39411/2/3 Low Power Synchronous Boost Converter," Preliminary Datasheet, Apr. 1998.
Williams, J. and Huffman, B., "Proper instrumentation eases low-power dc/dc converter design," EDN, Oct. 27, 1988.
Williams, J., "Signal conditioning circuits use *power design techniques," EDN, Aug. 20, 1987.
Williams, J., "Employ pulse-width modulators in a wide range of controllers," EDN, Sep. 2, 1981.
Williams, J., "Switching regulator takes on more power," Electronic Product Design, Jan. 1986.
Williams, J., "Design dc-dc converters to catch noise at the source," Electronic Design, Oct. 15, 1981.
Williams, J., "Conversion techniques adapt voltages to your needs," EDN, Nov. 10, 1982.
Williams, J., "Use low-power design methods to condition battery outputs," EDN, Oct. 18, 1984.
Williams, J., "Chopper amplifier improves operation of diverse circuits," EDN, Mar. 7, 1985.
Williams, J. and Huffman, B., "Design dc/dc converters for power conservation and efficiency," EDN, Nov. 10, 1988.
Williams, J. and Waller, B., "Performance-Enhancement Techniques for Three-Terminal Regulators," New Electronics, Oct. 4, 1983.
Williams, J. and Huffman, B., "Switched-capacitor networks simplify dc/dc-converter designs," EDN, Nov. 24, 1988.
Williams, J., "Regulator IC speeds design of switching power supplies," EDN, Nov. 12, 1987.
Williams, J., "Micropower circuits assist low-current signal conditioning," EDN, Aug. 6, 1987.
Williams, J. and Huffman, B., "Precise converter designs enhance system performance," EDN, Oct. 13, 1988.
Williams, J., "Bridge forms synchronous rectifier," EDN.
Williams, J., "Designing supplies for powering LCD backlighting," EDN, Oct. 29, 1992.
Williams, J., "1.5 to 5V converter supplies 200mA," EDN, Oct. 15, 1992.
Williams, J., "Design linear circuits that serve digital system needs," EDN, Apr. 27, 1989.
Williams, J., "Clever techniques improve thermocouple measurements," EDN, May 26, 1988.
Williams, J., "Design techniques extend V/F-converter performance," EDN, May 16, 1985.
Williams, J., "Design linear circuits for 5V operation," EDN, May 2, 1985.
Williams, J., "Considerations for Five Volt Linear Circuits," Professional Program Session Record 20, Circuits for Analog Signal Processing and Data Conversion is Single +5V Supply Systems, Wescon/85, Nov. 1985.
Williams, J., "Analog circuits operate from a 1.5V cell," EDN, Sep. 19, 1985.
Williams, J., "Astute designs improve efficiencies of linear regulators," EDN, Aug. 17, 1989.
Williams, J., "Galvanically isolated switching supplies provide high power," EDN, Nov. 26, 1987.
Williams, J., "Correcting power-supply problems," EDN, Oct. 10, 1991.
Borghi et al., "Discontinuous Conduction Mode Power Switching Regulator IC," PCI Oct. 1988 Proceedings, pp. 31-41, Oct. 1988.
Casey, L.F., "Circuit Design for 1-10 MHZ DC-DC Conversion," Massachusetts Institute of Technology ScD. Thesis, Fig. 3-15, pp. 73-80, 1989.
Cherry Semiconductor, "CS-5120 Synchronous NFET Buck Controller With V2 Architecture," Datasheet, Apr. 8, 1997.
Gontowski et al., "Advanced New Integrated Circuits for Current-Mose Control," Proceedings of the Power Electronics Show and Conference, pp. 341-352, Oct. 1986.
International Rectifier, "IR Application Note AN-978, HV Floating MOS Gate Driver ICs, Full Bridge With Current Mode Control," Application Note from web page, Date Unknown.
Intersil, "ISL6223 Mobile Microprocessor CORE Voltage Regulator Multi-Phase Buck PWM Controller," Data Sheet, Oct. 2001, File No. 9013.
Linear Technology, "LT1432 5V High Efficiency Step-Down Switching Regulator Controller," *1992 Linear Databook Supplement*, pp. 4-145 to 4-171.
Linear Technology, "LTC1625$^{NO}$ $^{R}$SENSE™ Current Mode Synchronous Step-Down Switching Regulator," Datasheet, 1998.
Linear Technology, "LTC1627 Monolithic Synchronous Step-Down Switching Regulator," Datasheet, 1998.
Linear Technology, "LTC1702 Dual 550 kHz Synchronous 2-Phase Switching Regulator Controller," Datasheet, 1999.
Linear Technology, "LTC1703 Dual 550 kHz Synchronous 2-Phase Switching Regulator Controller with 5-Bit VID," Datasheet, 1999.
Linear Technology, "LTC1775 High Power $^{NO}$ $^{R}$SENSE™ Current Mode Synchronous Step-Down Switching Regulator," Datasheet, 1999.
Linear Technology, "LTC1778 Wide Operating Range, $^{NO}$ $_{R}$SENSE™ Step-Down Controller," Datasheet, Jan. 2001.
Linear Technology, "LTC1873 Dual 550 kHz Synchronous 2-Phase Switching Regulator Controller With 5-Bit VID," Datasheet, 1999.
Linear Technology, "LTC1877 High Efficiency Monolithic Synchronous Step-Down Regulator," Initial Release, Final Electrical Specifications, May 2000.
Linear Technology, "LTC1878 High Efficiency Monolithic Synchronous Step-Down Regulator," Initial Release, Final Electrical Specifications, May 2000.
Linear Technology, "LTC3711 5-Bit Adjustable, Wide Operating Range, $^{NO}$ $^{R}$SENSE™ Step-Down Controller," Initial Release Datasheet, Jan. 2001.
Linear Technology, "LTC3714 Intel Compatible, Wide Operating Range, Step-Down Controller with Internal Op Amp," Initial Release Datasheet, Apr. 2001.
Linear Technology, Nelson, C., App. Note 19, "LT-1070 Design Manual," Jun. 1986.
Linear Technology, Wilcox, M., "LT1158 Half Bridge N-Channel Power MOSFET Driver," Datasheet, 1992.
Maxim Integrated Products, "MAX1710/MAX1711/MAX1712 High-Speed, Digitally Adjusted Step-Down Controllers for Notebook CPUs," Datasheet, 2000.
Maxim Integrated Products, "MAX887 100% Duty Cycle, Low-Noise, Step-Down PWM DC-DC Converter," Datasheet, Sep. 1996.
Micro Linear Corporation, "ML4861 Low Voltage Boost Regulator," Preliminary Datasheet, Jul. 1992.
Redl, et al., "Overload-Protection Methods for Switching-Mode DC/DC Converters: Classification, Analysis, and Improvements," PESC '87 Record, pp. 107-118, 1987.
Texas Instruments, "TPS40050, TPS40051, TBS40053 Wide-Input Synchronous Buck Controller," Datasheet, Sep. 2003.
Texas Instruments, "TPS40060, TPS40061 Wide-Input Synchronous Buck Controller," Datasheet, Feb. 2003.

Texas Instruments, "TPS5120 Dual Output, Two-Phase Synchronous Buck DC/DC Controller," Datasheet, Feb. 2001.

Umminger, Christopher, B., "New No$^R$SENSE™ Controllers Deliver Very Low Output Voltages," Linear Technology Magazine, pp. 16-20, Feb. 2001.

Unitrode, "UCC1582, UCC2582 High Efficiency Synchronous, Step Down Controller," Preliminary Datasheet, Jan. 1997.

Unitrode, "UCC29421/2, UCC39421/2 Multimode High Frequency PWM Controller," Preliminary Datasheet, Oct. 1999.

Williams, J. and Dendinger, S., "Simplify feedback controllers with a 2-quadrant PWM IC," EDN May 26, 1983.

Williams, J., "Special circuit-design techniques enhance regulator performance," EDN, Sep. 1, 1983.

Linear Technology, Nelson., C., "The LT1432:5 Volt Regulator Achieves 90% Efficiency," Linear Technology Magazine, vol. 2, No. 1, p. 12, continued on p. 19, Feb. 1992.

Maxim Integrated Products, Inc., "MAX635/36/37 Fixed Output CMOS Inverting Switching Regulators," Maxim 1989 Integrated Circuits Data Book, pp. 6-49 to 6-56, 1989.

Maxim Integrated Products, Inc., "MAX639 High-Efficiency, +5V Adjustable Step-Down Switching Regulator," Datasheet, Dec. 1991.

Maxim Integrated Products, Inc., "MAX783 Triple-Output Power-Supply Controller for Notebook Computers," Datasheet, May 1994.

Micro Linear Corporation, "ML4873 Battery Power Control IC," Advance Information Data Sheet, Mar. 15, 1993, pp. 1-8.

Uchida, Takahito, "Control Circuit for Switching Regulator," Japanese Inventor Associated Disclosed Technology Publication No. 92-2362, published Feb. 15, 1992 (in Japanese, with translation).

Wilcox, M., "The LT1158: Low Voltage, N-Channel Bridge Design Made Easy," Linear Technology Magazine, vol. 2, No. 1, Feb. 1992.

Williams, J., "Basic Principles and Ingenious Circuits Yield Stout Switches," EDN, Jan. 18, 1990.

Williams, J., "Refine V/F-converter operation with novel design techniques," EDN, May 30, 1985.

* cited by examiner

METHODS AND CIRCUITS FOR PROGRAMMABLE CURRENT LIMIT PROTECTION

FIELD OF THE INVENTION

The present invention relates to power converter circuits. More particularly, the present invention relates to methods and circuits for power converters having user-programmable current limit protection.

BACKGROUND OF THE INVENTION

Voltage regulators, which are a type of power converter, provide an output voltage to a load within a desired range of a nominal regulated value from a voltage source that may be poorly-specified or fluctuating, or that may be at an inappropriate amplitude for the load. Such regulators may employ a switching circuit that includes one or more switching elements coupled in series or in parallel with the load. The switching elements may be, for example, power metal-oxide semiconductor field-effect transistor (MOSFET) switches.

Control circuitry regulates the output voltage and the current supplied to the load by cycling the switch circuit between ON and OFF states. The duty cycle of the switch circuit controls the flow of power to the load, and can be varied by a variety of methods. For example, the duty cycle can be varied by (1) fixing the pulse stream frequency and varying the ON or OFF time of each pulse, (2) fixing the ON or OFF time of each pulse and varying the pulse stream frequency, or (3) a combination thereof.

To vary the ON or OFF time of each pulse or the pulse stream frequency, the control circuitry may generate a signal $V_e$ that is proportional to the difference between the regulator's output voltage and a reference voltage. $V_e$ may be used to provide either "voltage-mode" or "current-mode" regulation. In voltage-mode regulation, $V_e$ and a periodic sawtooth waveform $V_s$ may be provided as inputs to a comparator, the output of which controls the duty cycle of the switch circuit. In current-mode regulation, a voltage $V_i$ may be generated that is proportional to the current in the output inductor, and $V_i$ and $V_e$ may be provided as inputs to a comparator, the output of which controls the duty cycle of the switch circuit.

Synchronous switching regulators include at least two active switching elements that typically are driven by non-overlapping drive signals to supply current at an output voltage to a load within a desired range of a nominal regulated value. Synchronous switching regulators that use power MOSFET switches frequently are used in portable battery-powered electronic products and thermally-sensitive products. These regulators convert the typically fluctuating input voltage to a regulated output voltage. Such regulators can provide high operating efficiency and thus long battery life with little heat generation.

One fault condition that a regulator may experience is an over-current condition at the regulator output, where the current demanded by the load is significantly greater than the nominal maximum output current of the regulator. The over-current condition may cause excessive currents to flow through the components of the regulator and to be delivered at the regulator's output, causing potential damage to those components or the load, particularly when the over-current condition remains at the regulator output for a prolonged period of time.

Previous designs of switching regulators, such as the LTC1702 synchronous voltage-mode controlled buck regulator, have implemented current limit protection by comparing the drain-to-source voltage ($V_{DS}$) of one of the active switch elements, e.g., a MOSFET, of a synchronous switch to a reference voltage set by the user that represents the maximum allowable $V_{DS}$ voltage. The $V_{DS}$ voltage provides inductor current information through the relationship:

$$V_{DS}=I_L*R_{DS(ON)} \qquad \text{EQ. 1}$$

where $I_L$ is the inductor current and $R_{DS(ON)}$ is the resistance of the MOSFET when the MOSFET is ON. Since average inductor current $I_{L,AVG}$ approximately equals the output current in a buck regulator, the inductor current flowing through the MOSFET can be used as an indicator of the output current.

The LTC1702 compares the $V_{DS}$ voltage of the MOSFET to the user-set reference voltage with a transconductance (gm) amplifier, the output of which, averaged by an external capacitor, controls the duty cycle of the switching regulator. When the current limit is exceeded, the duty cycle is reduced slowly until the output current is regulated at the programmed current limit. One of the problems with this approach is that there may be a delay in reducing the initial duty cycle to the lower duty cycle. During the transient phase when the duty cycle is being reduced, the inductor current is unregulated and may cause excessive currents to flow, limited only by the normally small input source, MOSFET and inductor impedances.

Other current limit schemes, such as that employed by the TPS40050 buck regulator, uses a cycle-by-cycle comparator to monitor the $V_{DS}$ voltage of a top-side MOSFET of a synchronous switch and to instantly turn OFF the MOSFET when the $V_{DS}$ exceeds a maximum allowable voltage. This scheme, however, also has drawbacks because the top MOSFET must be turned ON to sense the current flowing through the inductor—a situation that is undesirable during an over-current condition—and thus requires an additional fault counter and restart scheme to keep the inductor current from running away, all without ever achieving steady-state regulation of the output current (i.e., regulation of the average value of the output current).

In view of the foregoing, it would be desirable to provide methods and circuits for protecting power converters from over-current conditions by providing both steady-state and cycle-by-cycle current limit protection.

It also would be desirable to provide methods and circuits for protecting power converters from over-current conditions, in which current limit thresholds are user-programmable.

It further would be desirable to provide methods and circuits for protecting power converters from over-current conditions, in which a signal indicative of inductor current flowing through the power converter is obtained without increasing output current, and thereby exacerbating the over-current condition.

It still further would be desirable to provide methods and circuits for protecting power converters from over-current conditions by providing cycle-by-cycle current limit protection, in which a signal indicative of inductor current flowing through the power converter is obtained without increasing output current, and thereby exacerbating the over-current condition.

SUMMARY OF THE INVENTION

In view of the foregoing, it is an object of the present invention to provide methods and circuits for protecting power converters from over-current conditions by providing both steady-state and cycle-by-cycle current limit protection.

It also is an object of the present invention to provide methods and circuits for protecting power converters from over-current conditions, in which current limit thresholds are user-programmable.

It further is an object of the present invention to provide methods and circuits for protecting power converters from over-current conditions, in which a signal indicative of inductor current flowing through the power converter is obtained without increasing output current, and thereby exacerbating the over-current condition.

It still further is an object of the present invention to provide methods and circuits for protecting power converters from over-current conditions by providing cycle-by-cycle current limit protection, in which a signal indicative of inductor current flowing through the power converter is obtained without increasing output current, and thereby exacerbating the over-current condition.

These and other objects of the present invention are accomplished by providing methods and circuits for protecting power converters from over-current conditions that, in a first illustrative embodiment, (1) bring average inductor current to steady-state regulation at a steady-state threshold; and (2) reduce the instantaneous inductor current after the inductor current exceeds a maximum instantaneous current threshold.

In the first illustrative embodiment, a synchronous voltage-mode switching regulator is provided having a current limit circuit that perceives the magnitude of the $V_{DS}$ voltage of a bottom-side synchronous switch element when the switch element is ON. The magnitude of the $V_{DS}$ voltage is proportional to the inductor current. When the magnitude of the $V_{DS}$ voltage exceeds a user-programmable maximum $V_{DS}$ reference threshold ($V_{MAX,REF}$) corresponding to a user-programmable steady-state current threshold, the current limit circuit slowly reduces the duty cycle of the voltage regulator until the average inductor current, and thus the output current (in buck mode), is reduced to the steady-state current threshold.

During this transient phase in which the regulator is bringing the average inductor current into steady-state regulation at the steady-state current threshold, the $V_{DS}$ voltage also is used to provide instantaneous regulation of the instantaneous inductor current. Illustratively, the bottom-side synchronous MOSFET is kept ON in buck mode after the magnitude of the $V_{DS}$ voltage of the bottom-side MOSFET exceeds a trip voltage threshold that corresponds to a maximum instantaneous current threshold that is greater than the steady-state current threshold. Accordingly, as the voltage regulator brings the average inductor current into steady-state regulation at the steady-state current threshold, the regulator also acts to prevent instantaneous current flowing through the regulator from reaching destructive levels.

In a second illustrative embodiment of the current limit protection circuits of the present invention, the steady-state current limit protection circuit of the first illustrative embodiment may be eliminated. Rather, a synchronous voltage-mode switching regulator may be provided, in which the bottom-side synchronous MOSFET is kept ON in buck mode after the magnitude of the $V_{DS}$ voltage of the bottom-side MOSFET exceeds a trip voltage threshold. Accordingly, the regulator prevents instantaneous inductor current flowing through the regulator from reaching destructive levels.

The current limit circuits of the present invention may be employed in regulators of all topologies, such as buck, boost, inverting, and SEPIC, and in regulators using either voltage-mode or current-mode control.

BRIEF DESCRIPTION OF THE DRAWINGS

Further features of the present invention, its nature and various advantages will be more apparent from the accompanying drawings and the following detailed description, in which.

DETAILED DESCRIPTION OF THE INVENTION

Figure 1A:
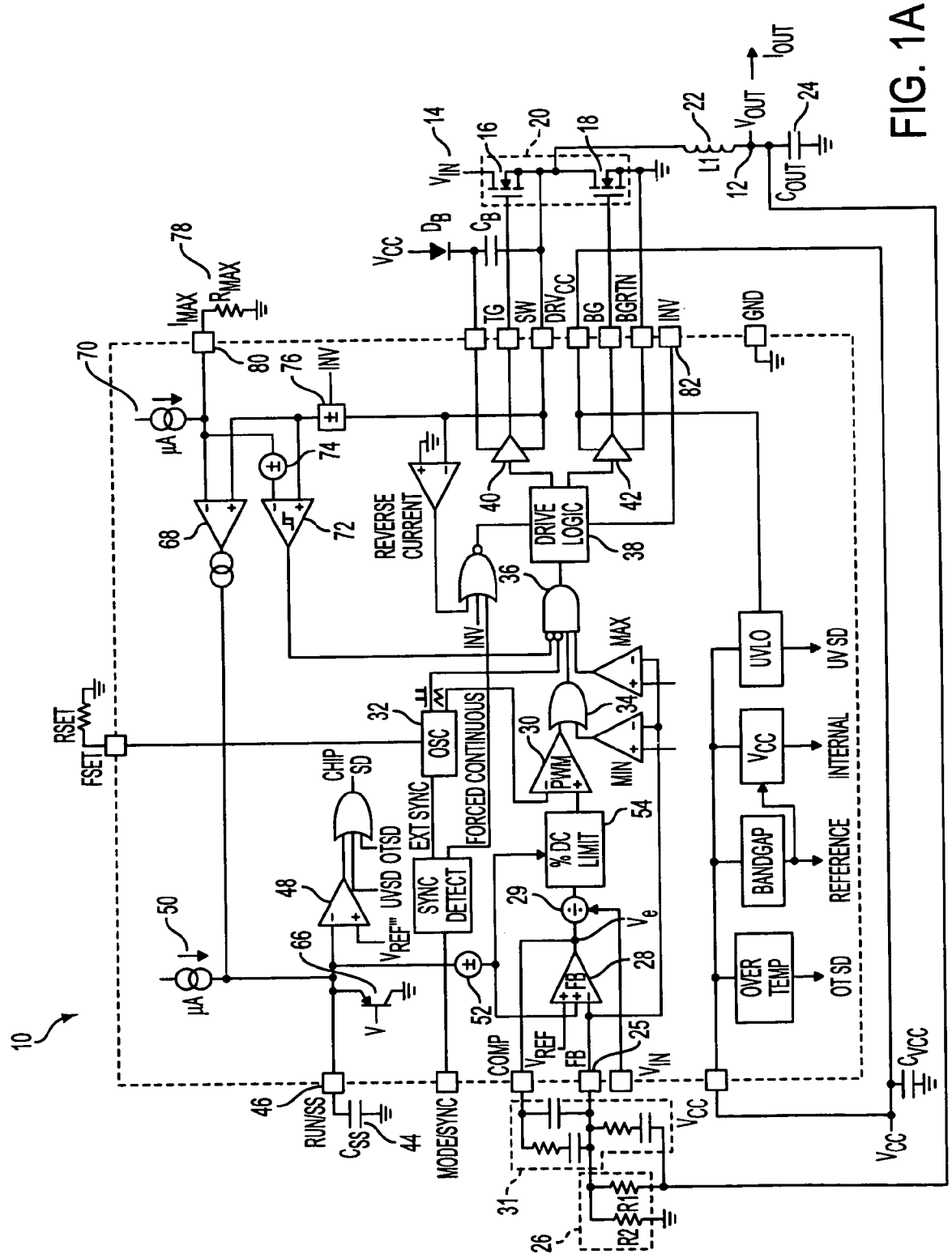
FIG. 1A is a block diagram of an illustrative synchronous voltage regulator configured to operate in buck mode, the voltage regulator incorporating an embodiment of the current limit protection circuits of the present invention.

Referring to FIG. 1A, an illustrative synchronous voltage regulator that operates in either buck or boost mode is described, the voltage regulator incorporating an embodiment of the current limit protection circuit of the present invention. Operation of voltage regulator 10 in buck mode is described first.

Voltage regulator 10 operates from a supply voltage $V_{IN}$, e.g., a battery, coupled to input terminal 14, and may be used to provide an output current at an output voltage $V_{OUT}$ within a desired range of a nominal regulated value at output terminal 12 for driving a load (not shown), e.g., a portable laptop computer or other battery-operated system, that is coupled to the output terminal. Output voltage $V_{OUT}$ is maintained at a regulated level by continuously and synchronously switching top-side MOSFET 16 and bottom-side MOSFET 18 of push-pull switch 20. In buck mode, top-side MOSFET 16 serves as the switch element that conducts inductor current when that current is ramping up, whereas bottom-side MOSFET 18 serves as the synchronous switch element that conducts inductor current when that current is ramping down. Push-pull switch 20 provides a supply of alternating voltage to energy storage elements—inductor 22, which conducts current in a sawtooth fashion, and output capacitor 24, which averages the sawtooth inductor current so that the load is supplied with an output current $I_{OUT}$ that supports load current demand at a regulated voltage.

In the voltage-mode controlled regulator of FIG. 1A, a feedback voltage ($V_{FB}$) proportional to the output voltage is generated at feedback pin 25 by voltage divider 26 comprising resistors R1 and R2. Voltage divider 26 is designed such that $V_{FB}$ equals $V_{REF}$ when output voltage $V_{OUT}$ equals the desired nominal output voltage. When output voltage $V_{OUT}$ is being regulated at the regulated value and there is no over-current condition at the regulator output, error amplifier 28 compares feedback voltage $V_{FB}$ to reference voltage $V_{REF}$, and generates error voltage $V_e$. The error amplifier has a third input (to be discussed further below) which does not affect operation of the voltage regulator when output voltage $V_{OUT}$ is being maintained at the regulated level. Error voltage $V_e$, stabilized by compensation circuit 31, is proportional to the difference between $V_{REF}$ and $V_{FB}$, and increases as the output voltage falls.

Error voltage $V_e$ is fed to feedforward compensation circuit 29, which adjusts the duty cycle (i.e., the percentage of time that inductor current $I_L$ is ramping up during a single switch cycle) of switch 20 with changes in input voltage to avoid overshoot and undershoot and makes the DC loop gain independent of input voltage. With feedforward compensation circuit 29, large transient steps at the input have little effect on the output voltage. An illustrative feedforward compensation circuit is described in greater detail in U.S. Pat. No. 5,055,767 by Nelson.

Feedforward compensation circuit 29 outputs a modulated error voltage ($V_{e,MOD}$), which is fed to duty cycle limit circuit 54. To be discussed in greater detail hereinbelow, duty cycle limit circuit 54 is configured to output a signal ($V_{DC}$) that is the lesser of the modulated signal from the feedforward compensation circuit and a voltage indicative of that at a soft-start pin. When output voltage $V_{OUT}$ is being regulated in steady-state operation at the regulated nominal value, duty cycle limit circuit 54 outputs the modulated signal from feedforward compensation circuit 29.

PWM comparator 30 compares signal $V_{DC}$ to a periodic sawtooth voltage signal provided by oscillator 32 to control the duty cycle of switch 20. More specifically, when the sawtooth signal is at a level less than signal $V_{DC}$ of the duty cycle limit circuit, PWM comparator 30 generates a logic HIGH signal that is delivered to OR gate 34, which in turn outputs a logic HIGH signal. The output of OR gate 34 is coupled to an input of AND gate 36. If the remaining non-inverted input to AND gate 36 is HIGH and the inverted inputs to AND gate 36 are LOW, AND gate 36 and drive logic gates 38 command driver 40 to turn ON top-side MOSFET 16 and driver 42 to turn OFF bottom-side MOSFET 18 so that current through inductor 22 ramps up. When the voltage of the sawtooth signal ramps up to a level greater than signal $V_{DC}$, PWM comparator 30 generates a logic LOW signal. Assuming the second input to OR gate 34 is also LOW, a logic LOW signal generated by PWM comparator 30 commands top-side MOSFET 16 to turn OFF and bottom-side MOSFET 18 to turn ON, ramping down inductor current $I_L$. Duration of the ON time of top-side MOSFET 16 is varied to maintain output voltage $V_{OUT}$ in regulation.

When the duration in which top-side MOSFET 16 is ON increases with respect to the duration in which bottom-side MOSFET 18 is ON, the duty cycle of switch 20 increases. Thus, the duty cycle is varied to maintain output voltage $V_{OUT}$ in regulation.

The switching frequency of push-pull switch 20 is also controlled by oscillator 32, which provides a pulsed timing signal of fixed-frequency that is the same as that of the sawtooth signal. The timing signal demarcates the beginning and end of each switch cycle by interposing logic HIGH signals between periods of logic LOW signals. Since the timing signal is supplied to an inverting input of AND gate 36, top-side MOSFET 16 is turned ON and bottom-side MOSFET 18 is turned OFF when the timing signal transitions to a logic LOW at the beginning of each switch cycle. When the timing signal transitions to a logic HIGH, the voltage regulator is commanded to turn OFF top-side MOSFET 16 and turn ON bottom-side MOSFET 18 if the remaining inputs to AND gate 36 have not already so commanded.

Voltage regulator 10 also employs a soft-start circuit that slowly increases the duty cycle of switch 20 and output voltage $V_{OUT}$ to its regulated value when the regulator is turned ON or after a regulator-imposed shutdown. The soft-start circuit comprises external, user-programmable soft-start capacitor 44 coupled to soft-start pin 46. The voltage at soft-start pin 46 limits the maximum duty cycle of switch 20, and thus the maximum output current, and transitions the voltage regulator into shutdown when the voltage is pulled low. In alternative embodiments, soft-start capacitor 44 may be replaced with an alternative analog or digital filter. As used herein, the term "user-programmable" refers to the capability of varying parameters of the power converter with external components or signals.

Figure 1B:
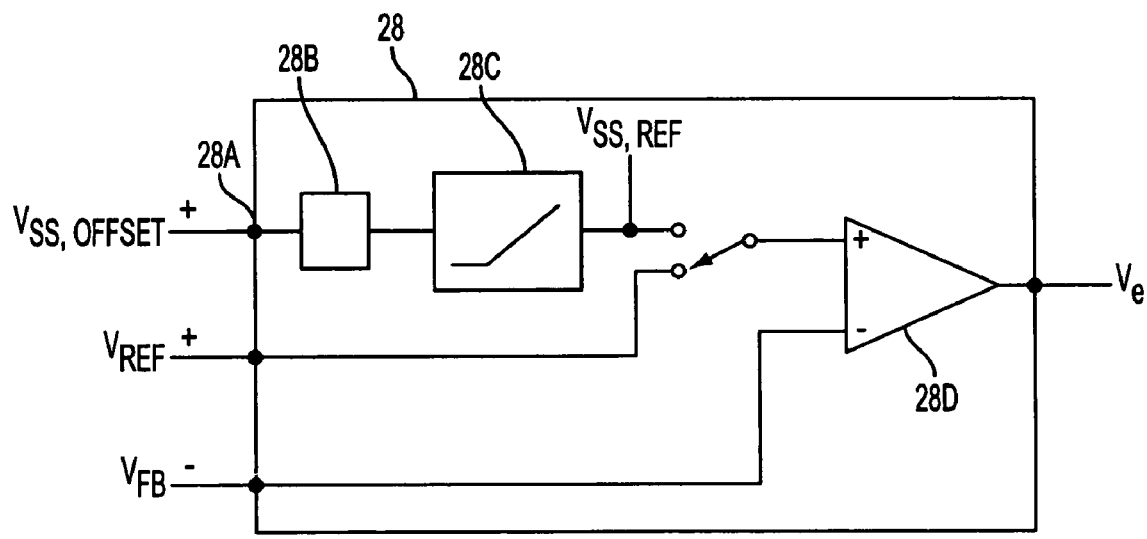
FIG. 1B is a block diagram of an illustrative error amplifier for use with the synchronous voltage regulator of FIG. 1A.

Releasing the soft-start pin allows internal current source 50 to charge soft-start capacitor 44, the internal current source 50 configured to source current in a constant or well-defined manner. As the soft-start capacitor is being charged, voltage $V_{SS}$ at soft-start pin 46 increases responsive thereto. Soft-start voltage $V_{SS}$ is adjusted by voltage offset 52, which reduces the soft-start voltage by a predetermined amount equal to turn-on threshold $V_{REF'''}$ of the voltage regulator, to generate offset soft-start voltage $V_{SS,OFFSET}$. This adjustment guarantees that the signal setting the duty cycle of switch 20 is at or below a level corresponding to a 0% duty cycle when the regulator is turned ON initially. The offset soft-start voltage is fed to non-inverting input 28A of error amplifier 28, where the offset soft-start voltage further is adjusted in the error amplifier as shown in FIG. 1B to generate soft-start reference voltage $V_{SS,REF}$. In the illustrative embodiment of FIG. 1B, error amplifier 28 incorporates voltage divider 28B that reduces offset soft-start voltage $V_{SS,OFFSET}$ by one half and clamp 28C that clamps soft-start reference voltage $V_{SS,REF}$ to a minimum level that is less than reference voltage $V_{REF}$ but greater than or equal to the voltage level at which the voltage regulator provides stable operation. Amplifier 28D then compares feedback voltage $V_{FB}$ against the lower value of reference voltage $V_{REF}$ or soft-start reference voltage $V_{SS,REF}$.

In an illustrative example, voltage offset 52 reduces soft-start voltage $V_{SS}$ by 1V and reference voltage $V_{REF}$ is 0.8V. Amplifier 28D of error amplifier 28 compares feedback voltage $V_{FB}$ to soft-start reference voltage $V_{SS,REF}$ rather than reference voltage $V_{REF}$ when soft-start voltage $V_{SS}$ is less than, e.g., 2.6–3V, and outputs error voltage $V_e$ which is proportional to the difference thereof. Offset soft-start voltage ($V_{SS,OFFSET}$) also is fed to duty cycle limit circuit 54, which outputs signal $V_{DC}$ that is the minimum of the offset soft-start voltage and modulated error signal $V_{e,MOD}$. It will be apparent to one of ordinary skill in the art that modifications may be made to error amplifier 28 without departing from the scope of the invention.

Figure 2:
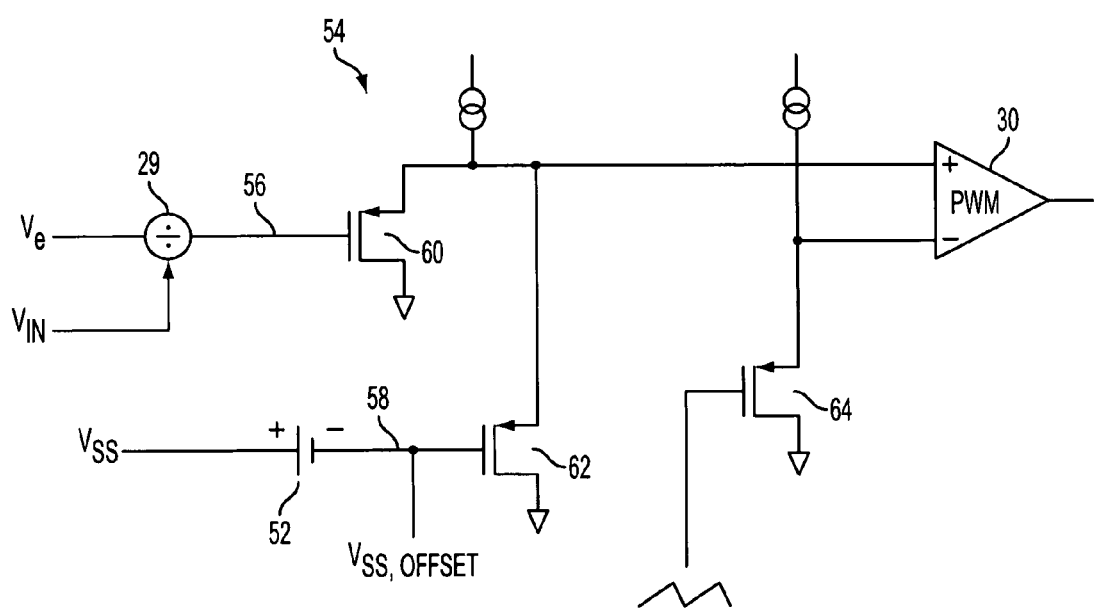
FIG. 2 is a simplified schematic diagram of a an embodiment of a circuit to limit the duty cycle of the voltage regulator of FIGS. 1A–B.

An illustrative embodiment of duty cycle limit circuit 54 is shown in FIG. 2. Duty cycle limit circuit 54 accepts modulated error voltage $V_{e,MOD}$ from feedforward compensation circuit 29 along lead 56 and offset soft-start voltage $V_{SS,OFFSET}$ along lead 58. Modulated error voltage $V_{e,MOD}$ and offset soft-start voltage $V_{SS,OFFSET}$ are fed to respective transistors 60 and 62, which level-shift each voltage by the same predetermined amount. The lower of the two resulting voltages is supplied to the non-inverting input of PWM comparator 30, and compared to the sawtooth waveform supplied by oscillator 32 to control the duty cycle of switch 20. As illustrated in FIG. 2, transistor 64 also level shifts sawtooth waveform by the same, predetermined amount as the modulated error and soft-start voltages. Because PWM comparator 30 exhibits non-linear performance if its input voltages are below a certain level, each transistor raises the modulated error and soft-start voltages and the sawtooth waveform to bypass the non-linear range. Each transistor also is coupled to a current source that biases the transistor to set the level-shift value.

Figure 3:
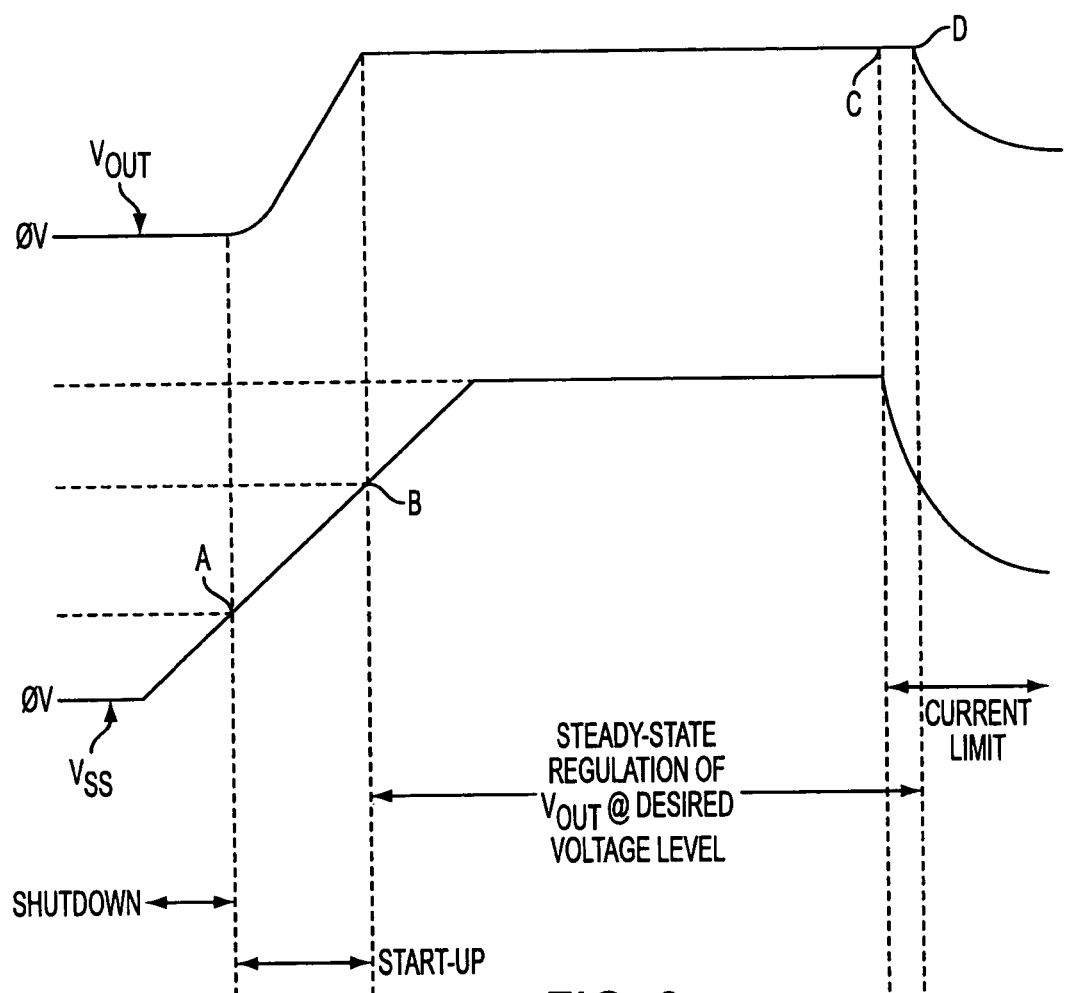
FIG. 3 depicts illustrative voltage waveforms of the output and soft-start voltages of the voltage regulator of FIGS. 1A–B.

Referring now to FIG. 3, illustrative waveforms of output voltage $V_{OUT}$ and soft-start voltage $V_{SS}$ for voltage regulator 10 is described. At point A, converter 10 comes out of shutdown when shutdown comparator 48 determines that soft-start capacitor 44 is charged to the voltage level of voltage offset 52, e.g., 1V as in the example discussed above. As soft-start capacitor 44 continues to charge, the duty cycle is gradually increased, allowing output voltage $V_{OUT}$ to rise. Between point A and point B, control of the duty cycle shifts from soft-start voltage $V_{SS}$ to reference voltage $V_{REF}$ input into error amplifier 28. At point B, output voltage $V_{OUT}$ has smoothly ramped to its regulated value. Thereafter, voltage regulator 10 regulates the output voltage at the regulated value. Current source 50 continues to charge soft-start capacitor 44 without influencing output voltage $V_{OUT}$ until soft-start voltage $V_{SS}$ is clamped at a voltage, e.g., 4V, set by transistor 66 (see FIG. 1A).

Referring back to FIG. 1A, an embodiment of the current limit protection circuit of the present invention is illustrated. Voltage regulator 10 comprises a steady-state current limit circuit that, responsive to an over-current condition at the regulator output, reduces the average current flowing through inductor 22 to a user-programmable steady-state current threshold during a transient phase and thereafter regulates average inductor current $I_{L,AVG}$ approximately at the steady-state current threshold. As is known in the art, regulation of the average inductor current at the steady-state threshold does not necessarily mean that the average inductor current is a constant value. Rather, the current may vary to some extent. In the embodiment of FIG. 1A, the steady-state current limit circuit illustratively comprises transconductance amplifier 68 and current source 70 that is coupled to an input of the transconductance amplifier and that facilitates a user in programming the steady-state threshold.

Voltage regulator 10 also comprises a cycle-by-cycle current limit circuit that, during the transient phase, commands (1) reduction of inductor current $I_L$ after the inductor current exceeds a maximum instantaneous threshold, and (2) escalation of inductor current $I_L$ after the inductor current decreases below a minimum instantaneous threshold. In the embodiment of FIG. 1A, the cycle-by-cycle current limit circuit illustratively comprises hysteretic comparator 72 and voltage offset 74.

The current limit protection circuit of FIG. 1A is configured to sense the drain-to-source voltage $V_{DS}$ of bottom-side MOSFET 18 when the bottom-side MOSFET is ON to obtain information about instantaneous inductor current $I_L$. Since the average inductor current approximately equals output current in a buck regulator, a signal indicative of the average difference between the $V_{DS}$ voltage and a user-programmable reference voltage provides information about and is used to control output current. When regulator 10 is in buck mode, the $V_{DS}$ voltage is negative with respect to ground when the bottom-side transistor is ON and output current is flowing out of output terminal 12. Inverter 76 inverts the negative voltage to permit comparison with a positive voltage at $I_{MAX}$ pin 80.

$I_{MAX}$ pin 80 also is coupled to current source 70, which, along with programming resistor 78 to ground, permits a user to program a current limit reference voltage $V_{MAX,REF}$ at $I_{MAX}$ pin 80 in a manner to be described in greater detail below. Current limit reference voltage $V_{MAX,REF}$ corresponds to the steady-state current threshold at which steady-state current limit protection initiates and to which the steady-state current limit circuit brings the average inductor current, and thus the output current (in buck mode), to steady-state regulation when the regulator experiences an over-current condition at its output.

To provide steady-state current protection, gm amplifier 68 compares the magnitude of the $V_{DS}$ voltage of MOSFET 18 with current limit reference voltage $V_{MAX,REF}$. The output of gm amplifier 68 is coupled to user-programmable soft-start capacitor 44. When the magnitude of the $V_{DS}$ voltage of MOSFET 18 exceeds $V_{MAX,REF}$ (i.e., inductor current $I_L$ exceeds the steady-state current threshold) at point C in FIG. 3, gm amplifier 68 begins discharging soft-start capacitor 44 by sinking current proportional to the difference between the inverted $V_{DS}$ voltage of MOSFET 18 and the current limit reference voltage $V_{MAX,REF}$ to ground, thereby reducing the voltage at soft-start pin 46. Gm amplifier 68 is configured only to sink current and not source current. When the magnitude of the $V_{DS}$ voltage of MOSFET 18 is less than current limit reference voltage $V_{MAX,REF}$, soft-start capacitor 44 is charged by current source 50 to a maximum level set by transistor 66. Gm amplifier 68 also incorporates a clamp that prevents the gm amplifier from pulling soft-start voltage $V_{SS}$ below the voltage, e.g., 1V, at which voltage regulator 10 shuts down.

The voltage at soft-start pin 46 is used to control the duty cycle of switch 20 as discussed above. As gm amplifier 68 continues to sink current and thereby reduce voltage at soft-start pin 46, the decreasing soft-start voltage begins to reduce the duty cycle of switch 20 after a time delay. This permits the voltage at the soft-start pin to reduce to a level at which it resumes control of the duty cycle. As the duty cycle is reduced, so too is the average inductor and output currents. Output voltage $V_{OUT}$ also decreases as the load discharges output capacitor 24, beginning at point D in FIG. 3.

Once the duty cycle is reduced to a percentage such that the average magnitude of the $V_{DS}$ voltage approximately is equal to current limit reference voltage $V_{MAX,REF}$, i.e., the average inductor current has been reduced approximately to the steady-state current threshold, the steady-state current limit circuit regulates the average magnitude of the $V_{DS}$ voltage approximately at the current limit reference voltage, thereby regulating the inductor current, and thus the output current in a buck regulator, approximately at the steady-state current limit threshold. More specifically, when the average magnitude of the $V_{DS}$ voltage has decreased to the current limit reference, voltage regulator 10 regulates the duty cycle approximately at a constant percentage by (1) discharging soft-start capacitor 44 with gm amplifier 68 when the magnitude of the $V_{DS}$ voltage rises above current limit reference voltage $V_{MAX,REF}$, and (2) recharging the soft-start capacitor with current source 50 when the magnitude of the $V_{DS}$ voltage decreases below the current limit reference voltage. Accordingly, when the average inductor current $I_{L_{AVG}}$ is in steady-state regulation at the steady-state current limit, the instantaneous inductor current $I_L$ ripples about the steady-state current limit until the over-current condition is removed.

If the over-current condition worsens (i.e., load current demand increases) while the average inductor current, and thus the output current, is being regulated at steady-state, the average inductor and output currents increase therewith. Gm amplifier 68 again discharges soft-start capacitor 44 until the duty cycle has decreased to a percentage such that the average inductor current is reduced and brought into steady-state regulation at the steady-state current limit.

Figure 1C:
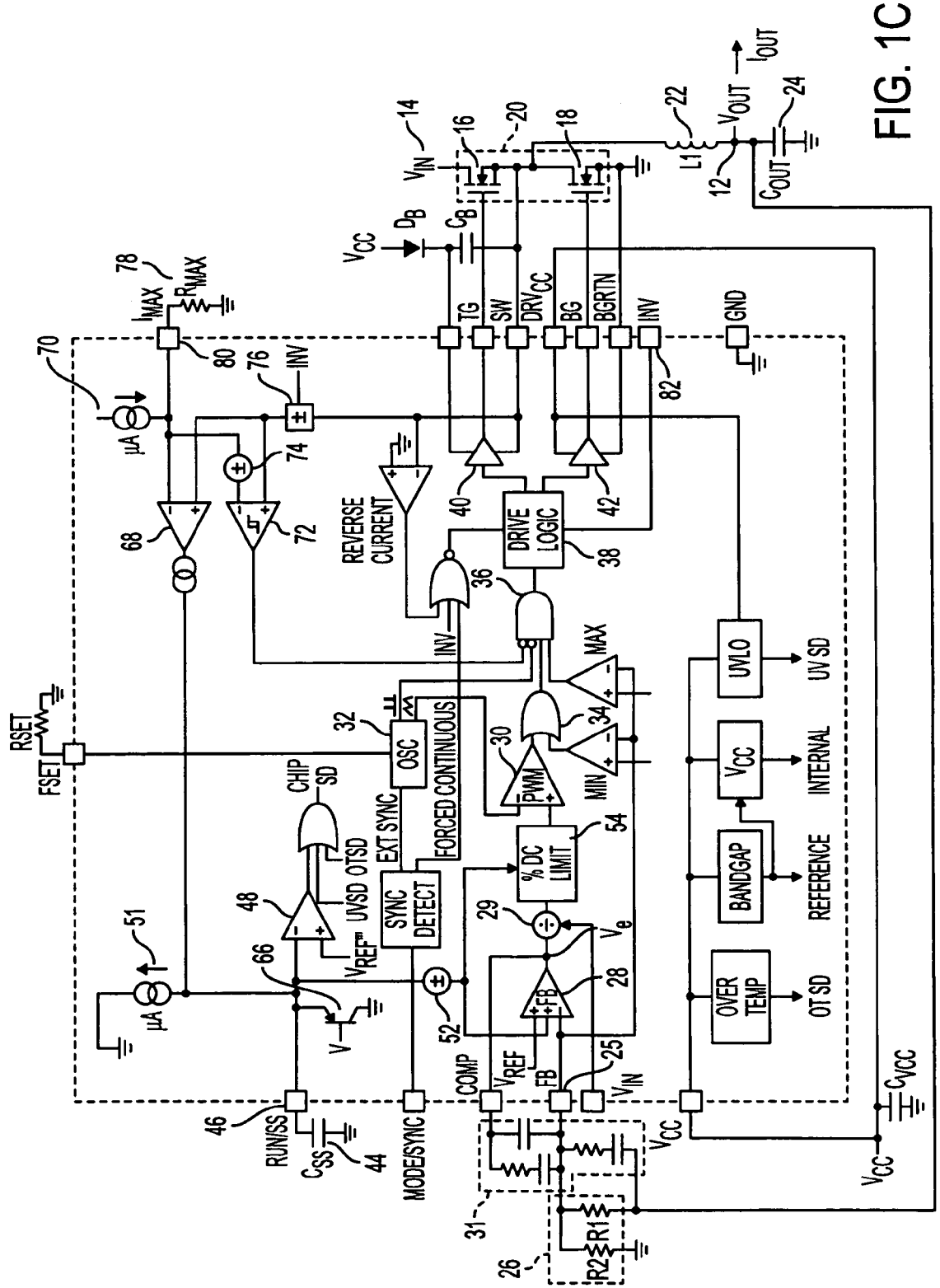
FIG. 1C is an alternative embodiment of the voltage regulator of FIGS. 1A–B.

In an alternative embodiment of FIG. 1A, illustrated in FIG. 1C, current source 50 may be replaced with current sink 51 that discharges soft-start capacitor 44 in a constant or well-defined manner, while gm amplifier 68 may be configured to source current to the soft-start capacitor. During soft-start, gm amplifier 68 may be configured to slowly charge up soft-start capacitor 44 to a maximum voltage level set by an internal clamp within gm amplifier 68 or by transistor 66. When the magnitude of the $V_{DS}$ voltage of bottom-side MOSFET 18 is less than current limit reference voltage $V_{MAX,REF}$, gm amplifier 68 may be configured to source current to the soft-start capacitor at a level to maintain the voltage across the soft-start capacitor at the maximum voltage level. If the magnitude of the $V_{DS}$ voltage of bottom-side MOSFET 18 increases above current limit reference voltage $V_{MAX,REF}$, gm amplifier 68 may be configured to reduce its sourced current as the magnitude of the $V_{DS}$ voltage of the bottom-side MOSFET increases above current limit reference voltage $V_{MAX,REF}$. Since current sink 51 discharges soft-start capacitor 44 in opposition to gm amplifier 68, current sink 51 and gm amplifier 68 work in concert to regulate the voltage across soft-start capacitor 44, and thereby control the duty cycle of switch 20 as described above.

During the transient phase in which the steady-state current limit circuit is bringing the average inductor current into steady-state regulation at the steady-state current threshold, the cycle-by-cycle current limit circuit employs hysteretic comparator 72 to prevent instantaneous inductor current $I_L$ from reaching destructive levels. Hysteretic cycle-by-cycle comparator 72 compares the magnitude of the $V_{DS}$ voltage of MOSFET 18 with trip and untrip thresholds that are set via voltage offset 74 relative to the current limit reference voltage $V_{MAX,REF}$. While MOSFET 16 is ON, comparator 72 cannot trip, since the magnitude of the $V_{DS}$ voltage of MOSFET 18 is not available to the current limit circuit of FIG. 1A until MOSFET 18 turns ON. Once switch 20 transitions into the OFF state, turning ON bottom-side MOSFET 18 and turning OFF top-side MOSFET 16 in buck mode, comparator 72 trips when the magnitude of the $V_{DS}$ voltage exceeds the trip threshold, commanding top MOSFET 16 to be maintained OFF through succeeding switch cycles until the magnitude of the $V_{DS}$ voltage has decreased below the untrip threshold. Thereafter, cycle-by-cycle comparator 72 untrips and commands top-side MOSFET 16 to turn ON and bottom-side MOSFET 18 to turn OFF immediately independent of the clock cycle (i.e., the pulsed timing signal provided by oscillator 32). This fixes the lower limit of the instantaneous inductor current during the transient phase.

Pursuant to one aspect of the present invention, the trip and untrip thresholds of cycle-by-cycle comparator 72 are set relative to maximum reference limit $V_{MAX,REF}$ such that the average magnitude of the $V_{DS}$ voltage during the transient phase of steady-state current protection is greater than or equal to maximum reference limit $V_{MAX,REF}$. This prevents the cycle-by-cycle comparator from interfering with the operation of the gm amplifier in reducing the duty cycle of the voltage regulator. Indeed, the untrip threshold even may be set at a voltage level greater than maximum reference limit $V_{MAX,REF}$. In the cycle-by-cycle current limit circuit of FIG. 1A, the trip and untrip thresholds are set using voltage offset 74 to offset the hysteretic band of comparator 72 relative to the programmed voltage at $I_{MAX}$ pin 80. The trip threshold is set low enough to provide adequate instantaneous current protection during the transient phase.

To program current limit reference voltage $V_{MAX,REF}$, and thus the steady-state current threshold, a user makes a calculated or empirical selection of an appropriate value for the resistance of programming resistor 78. In particular, programming resistor 78 ($R_{IMAX}$) may be selected based on the following equation:

$$R_{IMAX} = V_{MAX,REF} / I_{SOURCE} \quad \text{EQ. 2}$$

where $V_{MAX,REF}$ is the expected voltage drop across bottom MOSFET 18 at the maximum desired average inductor current and maximum junction temperature, and $I_{SOURCE}$ is the current provided by current source 70.

For example, if $R_{IMAX}$ is in the range between 8.3 kΩ and 42 kΩ and $I_{SOURCE}$ is 12 uA, the current limit circuit would bring the average inductor current into steady-state regulation at the steady-state current threshold that corresponds to an average magnitude of the $V_{DS}$ voltage between 100 mV and 500 mV, respectively. The minimum value of current limit generally occurs with the largest input voltage (VIN) at the highest ambient temperature, conditions that cause the largest power loss in the converter.

$V_{MAX,REF}$ may be empirically determined or calculated according to the following relationship:

$$V_{MAX,REF} = I_{LIMIT} * R_{DS(ON)} * (1+\delta) \quad \text{EQ. 3}$$

where $I_{LIMIT}$ is the maximum desired average inductor current, $R_{DS(ON)}$ is the on-resistance of MOSFET 18, and $\delta$ is the temperature dependency of $R_{DS(ON)}$. The maximum current limit may be determined by the minimum MOSFET on-resistance. The current limit circuit of voltage regulator 10 may be disabled by floating the $I_{MAX}$ pin.

Figure 4:
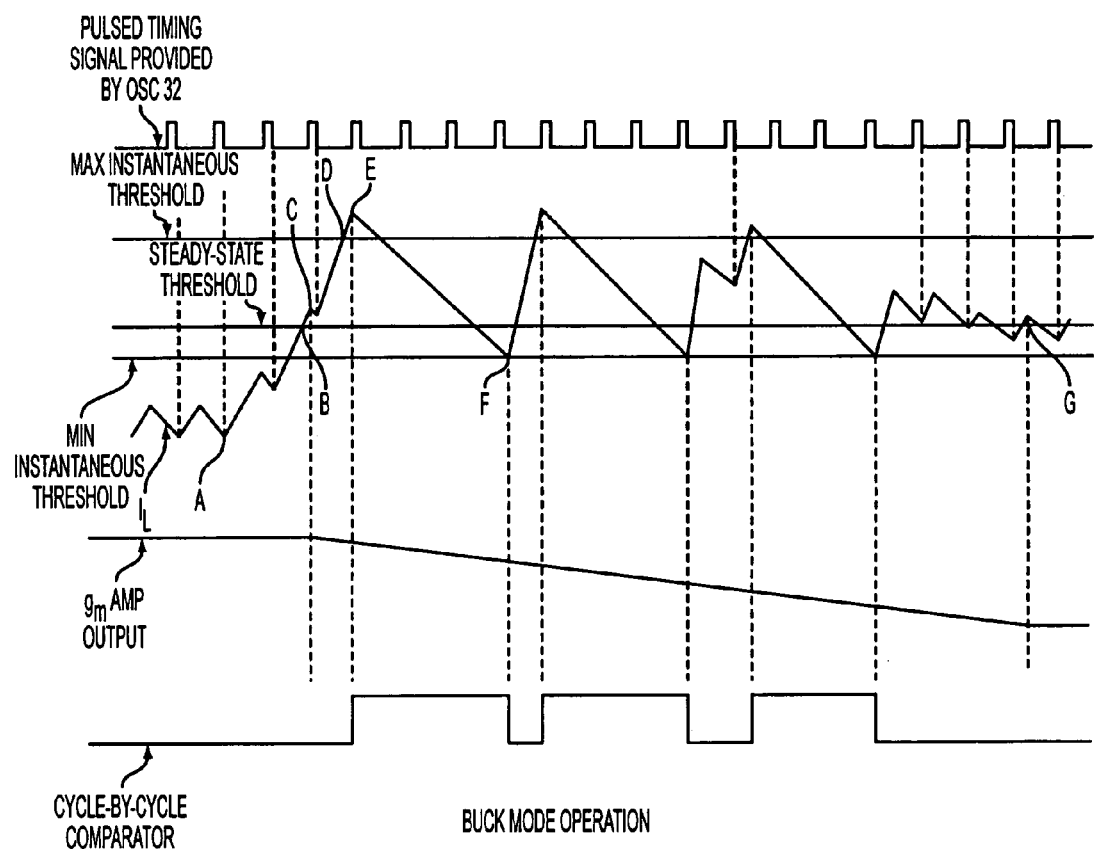
FIG. 4 shows illustrative current and voltage waveforms of the circuit of FIGS. 1A–B when the voltage regulator is operating in buck mode.

Referring now to FIG. 4 in combination with FIG. 1A, operation of the current limit protection circuit of FIG. 1A is described. When voltage regulator 10 experiences an over-current condition at its output at time A, inductor current $I_L$ continues to increase. When the inductor current exceeds the steady-state current threshold corresponding to current limit reference voltage $V_{MAX,REF}$ at time B, the $V_{DS}$ voltage against which the current limit voltage reference $V_{MAX,REF}$ is compared is unavailable. Thus, the inductor current continues to increase.

When the bottom MOSFET turns ON at time C, the $V_{DS}$ voltage is available to gm amplifier 68. Since inductor current $I_L$ is greater than the steady-state current limit, gm amplifier 68 begins to discharge soft-start capacitor 44 and sink the discharged current to ground in an amount proportional to the difference between the inductor current and the steady-state current threshold. As soft-start capacitor 44 slowly discharges, soft-start voltage $V_{SS}$ at pin 46 decreases therewith, slowly reducing the duty cycle of the voltage regulator. Since the duty cycle has not been reduced to a low enough level to limit inductor current $I_L$ below the steady-state current limit, inductor current $I_L$ continues to increase.

At time D, the inductor current exceeds the maximum instantaneous current threshold corresponding to the trip voltage threshold. However, because bottom-side MOSFET 18 is not ON until time E, and thus the $V_{DS}$ voltage is not available for comparison by cycle-by-cycle comparator 72, the inductor current continues to increase. At time E, switch 20 turns ON bottom-side MOSFET 18 and turns OFF top-side MOSFET 16. Cycle-by-cycle comparator 72 trips and issues a command to maintain top-side MOSFET 16 in the OFF state at the next switching cycle. Top-side transistor 16 stays OFF until time F, when inductor current $I_L$ has decayed to the minimum instantaneous current threshold corresponding to the untrip voltage threshold. Cycle-by-cycle comparator 72 untrips and issues a command to turn top-side MOSFET 16ON and bottom-side MOSFET 18 OFF. Thereafter, cycle-by-cycle comparator 72 trips and untrips for a number of cycles until time G when gm amplifier 68 has reduced the duty cycle of the voltage regulator low enough to keep the average inductor current, and thus output current $I_{OUT}$ (in a buck regulator), at the user-programmable steady-state current threshold corresponding to current limit reference voltage $V_{MAX,REF}$. At this point, the duty cycle has been reduced low enough so that cycle-by-cycle comparator 72 no longer trips and the steady-state current limit circuit regulates the inductor current in steady-state regulation approximately at the steady-state current threshold.

Once the over-current condition is removed from the output of the voltage regulator, the feedback loop reduces inductor current $I_L$ below the steady-state current threshold. Consequently, gm amplifier 68 stops discharging soft-start capacitor 44, which is recharged by current source 50 so that the voltage regulator can regulate output voltage $V_{OUT}$ at the desired nominal output voltage.

Voltage regulator 10 also comprises other features that are not described in detail herein. For example, voltage regulator 10 comprises circuits to enable undervoltage lockout that shuts down the regulator when the power supply is less than a predetermined threshold, pulse skip mode to increase efficiency at light loads, reverse current detection, over-temperature detection that shuts down the voltage regulator responsive to an excessive temperature, and MAX and MIN comparators that ensure that the output voltage does not exceed or decrease below the desired nominal output voltage by a particular range. Of course, additional circuits may be included or modifications may be made based on the needs of the user application.

Figure 5:
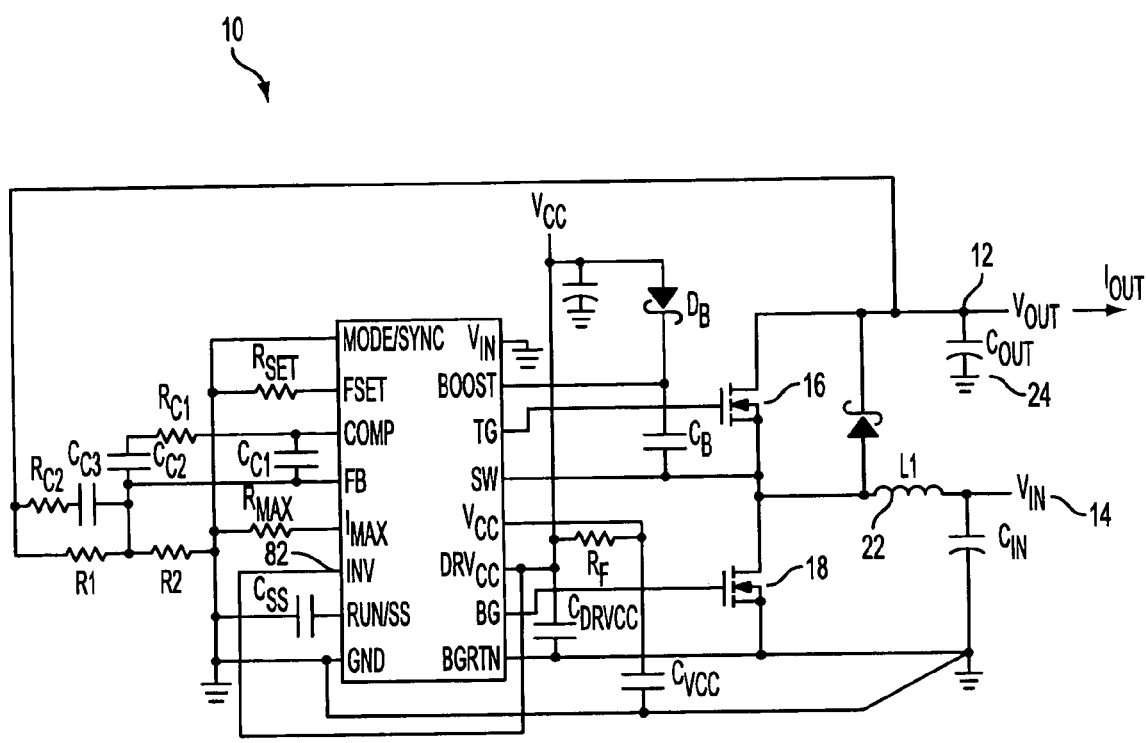
FIG. 5 is an illustrative embodiment of the synchronous voltage regulator of FIGS. 1A–B configured to operate in boost mode.

Referring now to FIGS. 1 and 5, voltage converter 10 of the present invention also may be employed as a boost converter. When INV pin 82 is grounded, voltage converter 10 operates in buck mode in a manner described in detail above. However, when INV pin 82 is pulled up by a predetermined voltage, e.g., 2V, voltage converter 10 operates in boost mode, wherein bottom-side MOSFET 18 acts as the switch element that conducts inductor current when that current is ramping up and top-side MOSFET 16 acts as the switch element that conducts inductor current when that current is ramping down. As illustrated in FIG. 5, input voltage VIN is coupled to input terminal 14, which is disposed in series with inductor 22, whereas top-side MOSFET 16 is coupled to output capacitor 24, which delivers output current $I_{OUT}$ to a load that may be coupled thereto.

Operation of voltage regulator 10 in boost mode is similar to that described above for buck mode operation with some exceptions. First, when the voltage regulator is in boost mode, pulse skip mode and feedforward compensation are disabled.

In boost mode, the average inductor current does not approximately equal the output current. Rather, average inductor current $I_{L,AVG}$ is a function of both duty cycle and output current $I_{OUT}$ according to the following relationship:

$$I_{L,AVG} = I_{OUT}/(1-D) \qquad \text{EQ. 4}$$

where D is the duty cycle. In a boost converter, the duty cycle may be determined by the following relationship:

$$D = (V_{OUT} - V_{IN})/V_{OUT} \qquad \text{EQ. 5}$$

In order to ensure that the current limit circuit does not initiate at loads less than the maximum desired current, $R_{MAX}$ should be programmed at maximum expected duty cycle (minimum $V_{IN}$). This relationship should be taken into account when calculating an appropriate value for the resistance of programming resistor 78 in boost mode pursuant to EQS. 2 and 3 given above.

Figure 6:
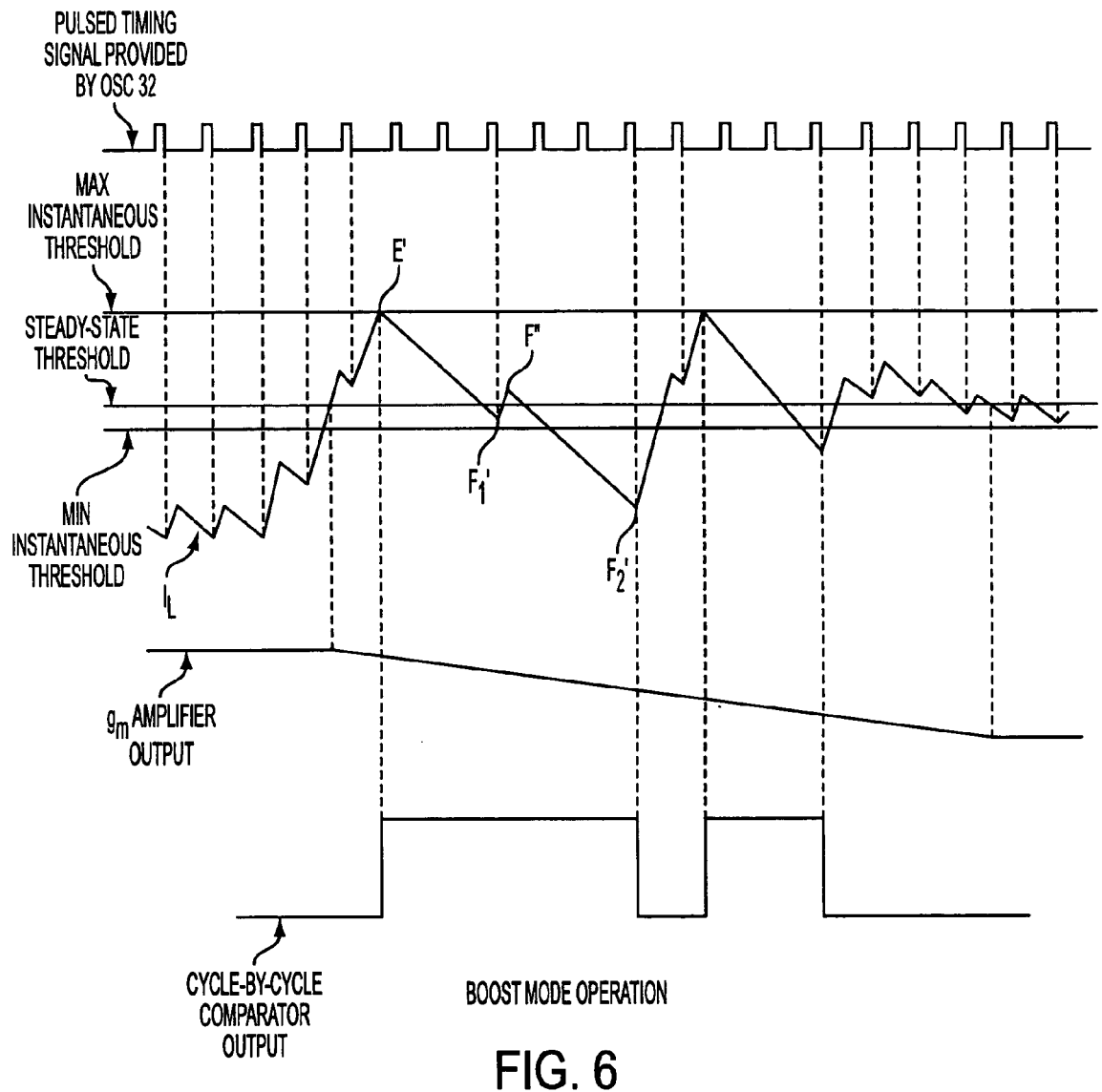
FIG. 6 shows illustrative current and voltage waveforms of the circuit of FIGS. 1A–B when the voltage regulator is operating in boost mode.

In boost mode, the current limit circuit of voltage converter 10 is configured to measure the inductor current by sensing the $V_{DS}$ voltage of bottom-side MOSFET 18 when MOSFET 18 is ON. This arrangement allows for easy implementation. However, in a boost converter, the $V_{DS}$ voltage across the bottom-side MOSFET is positive. Accordingly, inverter 76 is disabled to permit comparison against a positive voltage at $I_{MAX}$ pin 80. Furthermore, because the $V_{DS}$ voltage of bottom-side MOSFET 18 immediately is available to cycle-by-cycle comparator 72 when the inductor current increases to the maximum instantaneous current threshold, the cycle-by-cycle comparator trips immediately at time E' in FIG. 6, turning OFF bottom-side MOSFET 18 and turning ON top-side MOSFET 16, thereby permitting inductor current $I_L$ to decrease. In contrast, when voltage regulator 10 operates in buck mode, comparator 72 delays comparator trip to time E in FIG. 4 when bottom-side MOSFET 18 turns ON and its $V_{DS}$ voltage becomes available to the comparator.

Furthermore, because the $V_{DS}$ voltage of bottom-side MOSFET 18 is unavailable to cycle-by-cycle comparator 72 when inductor current $I_L$ decreases, voltage regulator 10 is designed to turn ON bottom-side MOSFET 18 and turn OFF top-side MOSFET 16 (at time $F_1'$ in FIG. 6) three switch cycles after the cycle-by-cycle comparator trips. It does that so that cycle-by-cycle comparator 72 can access the $V_{DS}$ voltage of bottom-side MOSFET 18 to determine whether inductor current $I_L$ has decreased to a value less than the minimum instantaneous threshold. If the inductor current has decreased to a value less than the minimum instantaneous threshold at the end of the third switch cycle (e.g., at time $F_2'$), cycle-by-cycle comparator 72 untrips and permits voltage regulator 10 to operate normally until the inductor current once again reaches the maximum instantaneous threshold, at which time the cycle-by-cycle comparator trips again.

However, if the inductor current has not decreased to a value less than the minimum instantaneous threshold, voltage regulator 10 repeats the above-described process until the inductor current has decreased to a value less than the minimum instantaneous threshold. More specifically, after the bottom-side MOSFET is turned OFF and the top-side MOSFET is turned ON at the end of the present switch cycle at time F", voltage regulator 10 maintains bottom-side MOSFET 18 OFF and top-side MOSFET 16ON for another three switch cycles. At the end of the third switch cycle, bottom-side MOSFET 18 is turned ON and top-side MOSFET 16 is turned OFF so that cycle-by-cycle comparator 72 can access the $V_{DS}$ voltage of bottom-side MOSFET 18 to determine whether inductor current $I_L$ has decreased to a value less than the minimum instantaneous threshold. In contrast, when voltage regulator 10 operates in buck mode, comparator 72 immediately untrips at time F in FIG. 4 since the $V_{DS}$ voltage of MOSFET 18 immediately is available to comparator 72 at that time.

In a dedicated boost regulator, the current limit circuit of the present invention may be configured to sense the $V_{DS}$ voltage of the synchronous switch element during its ON time.

In boost mode, voltage regulator 10 provides current limit protection for "soft" shorts (i.e., when output voltage $V_{OUT}$ is greater than input voltage VIN) because, when output voltage $V_{OUT}$ is less than input voltage $V_{IN}$, there is no reversal of polarity across inductor 22. For "hard" shorts, the inductor current is limited by the input supply capability and the series impedances of the inductor and the MOSFETs.

Figure 7:
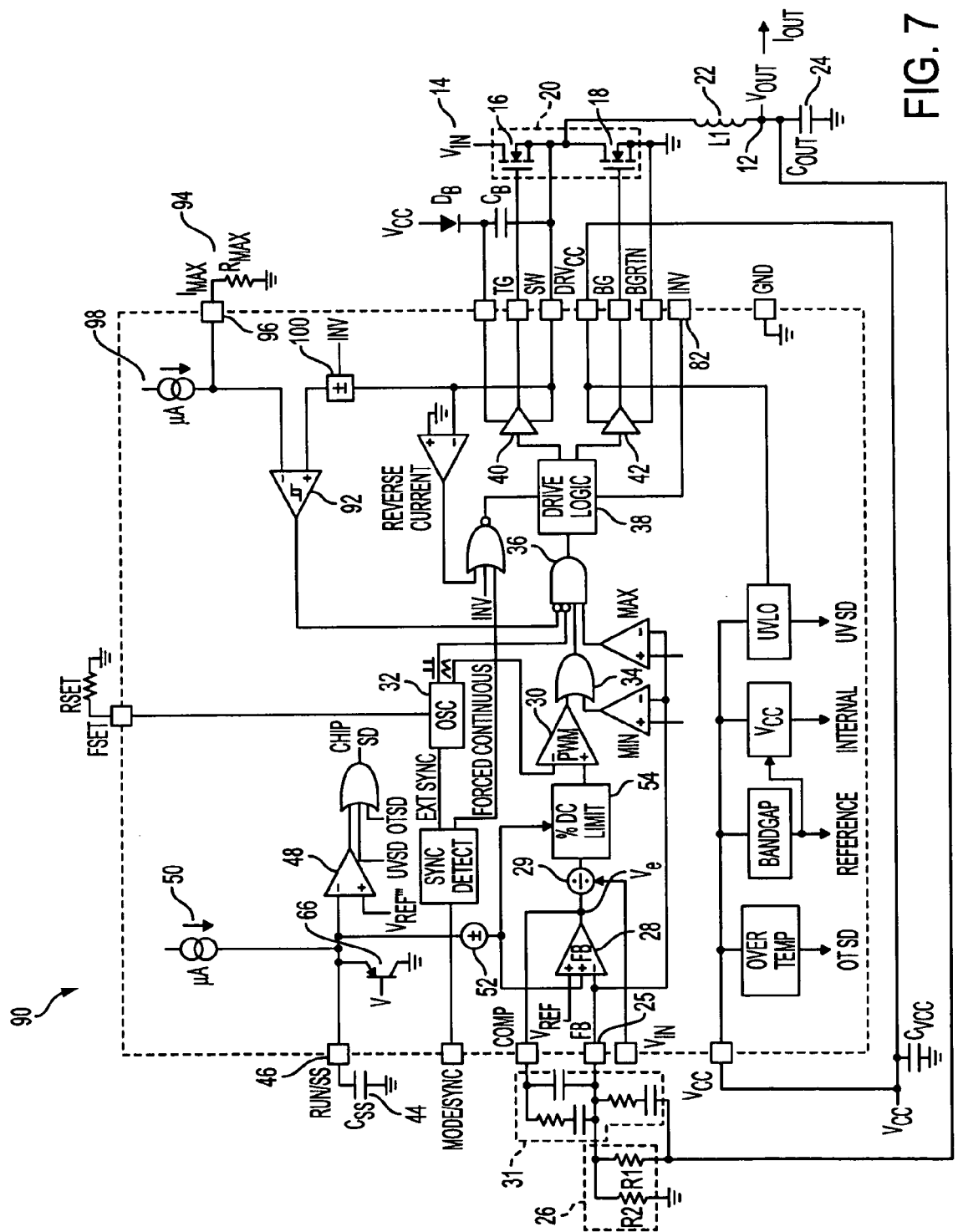
FIG. 7 is a block diagram of a second embodiment of a synchronous voltage regulator configured to operate in buck mode, the voltage regulator incorporating a second embodiment of a current limit protection circuit of the present invention.

Referring now to FIG. 7, a second embodiment of a current limit protection circuit of the present invention is depicted, in which voltage regulator 90 may be configured to operate in either buck or boost mode. Voltage regulator 90 is similar to voltage regulator 10 of FIGS. 1A–B and 5, except that the steady-state current limit protection circuit incorporated in voltage regulator 10 is eliminated. To protect against over-current conditions, voltage regulator 90 includes hysteretic comparator 92, which compares the magnitude of the $V_{DS}$ voltage of bottom-side MOSFET 18 with trip and untrip thresholds set by the hysteresis of hysteretic comparator 92 relative to a user-programmable current limit threshold. The current limit threshold is set by user-programmable resistor 94 coupled via $I_{MAX}$ pin 96 to current source 98 in a manner similar to that described above. Furthermore, because the steady-state current limit protection circuit is eliminated in voltage regulator 90, voltage offset 74 (see FIG. 1A) also may be eliminated. The cycle-by-cycle current limit circuit of FIG. 7 operates in a manner similar to that described above with respect to the cycle-by-cycle current limit circuit of FIGS. 1A–B and 5.

Although illustrative embodiments of the present invention are described above, it will be apparent to one skilled in the art that various changes and modifications may be made without departing from the invention. For example, while the above-described embodiment measured inductor current by sensing the $V_{DS}$ voltage of a switch element during its ON time, the current limit circuit of the present invention also may perceive inductor current by sensing the voltage drop across a resistive current shunt disposed in series with inductor 22 or across a transistor coupled in parallel with one of the switch elements. Alternative embodiments of current sensors also may be employed, such as current transformers, Hall effect devices, optical current sensors, or current mirrors.

Furthermore, while gm amplifier 68 of voltage regulator 10 of FIG. 1A is coupled to and discharges soft-start capacitor 44, soft-start capacitor 44 may be replaced by a different analog or digital filter or the gm amplifier instead may be coupled to and discharge a user-programmable or internal filter dedicated to over-current protection. This permits a voltage regulator incorporating the current limit circuits of the present invention to use alternative soft-start schemes.

In alternative embodiments of the cycle-by-cycle current limit circuit of FIGS. 1A–B, 5 and 7, hysteretic comparator 72 or 92 may be replaced by two separate comparators—a first comparator that commands top-side MOSFET 16 to be kept OFF after the magnitude of the $V_{DS}$ voltage of bottom-side MOSFET 18 exceeds the trip threshold, and a second comparator that commands top-side MOSFET 16 to be turned ON and bottom-side MOSFET 18 to be turned OFF after the magnitude of the $V_{DS}$ voltage decreases below the untrip threshold in buck mode or after three switch cycles in boost mode. Furthermore, rather than untripping the cycle-by-cycle comparator after instantaneous inductor current IL decreases below a minimum instantaneous threshold, voltage regulators 10 and 90 also may be configured to untrip the cycle-by-cycle comparator after a predetermined amount of time or number of switch cycles.

In addition, while the above-described embodiments depict the use of synchronous switches, each having two active switching elements (e.g., two MOSFETs) that are driven out of phase to supply current at a regulated voltage to a load, one of ordinary skill in the relevant art would appreciate that one of the two MOSFETs may be replaced with a passive switch element, such as a switching diode, depending on the mode of operation. The present invention also may be integrated with voltage regulators employing other types of switches having, e.g., a pair of N-MOSFETS, a pair of P-MOSFETS, one or more bipolar junction transistors or insulated gate bipolar transistors.

It will be apparent to one of ordinary skill in the art that the cycle-by-cycle current limit circuit of the present invention may be configured to turn the top-side switch element ON and the bottom-side switch element OFF at a predetermined time after the inductor current exceeds the maximum instantaneous current threshold in buck mode, rather than waiting for the inductor current to decrease to the minimum instantaneous current threshold. Likewise, the cycle-by-cycle current limit circuit of the present invention may be configured to turn the bottom-side switch element ON and the top-side switch element OFF at a predetermined time after the inductor current exceeds the maximum instantaneous current threshold in boost mode.

Furthermore, while the above-described embodiment incorporates voltage-mode regulation of the converter's duty cycle, it should be obvious to one of ordinary skill in the art that the current limit circuit of the present invention also may be integrated with power converters having current-mode regulation. The current limit circuit of the present invention also may be integrated with alternative topologies, such as inverting and SEPIC regulators.

All reference voltages defining the predetermined thresholds may comprise the same threshold levels or one or more different levels, and may be constant or variable in nature. All current and voltage values provided herein are for illustrative purposes only, unless otherwise stated. Other values may be employed based on design choice.

It is intended in the appended claims to cover all such changes and modifications that fall within the true spirit and scope of the invention.

What is claimed is:

1. A current limit circuit for protecting a power converter, the current limit circuit coupled to (1) an inductor through which inductor current flows, the inductor current having instantaneous and average inductor current values; (2) a switch having at least one switch element and a duty cycle; and (3) a filtering component having an adjustable filtered signal, the current limit circuit comprising:

a steady-state current limit circuit that reduces average inductor current value to a steady-state threshold during a transient phase and regulates average inductor current value approximately at the steady-state threshold responsive to an over-current condition; and a cycle-by-cycle current limit circuit that commands reduction of instantaneous inductor current value after the instantaneous inductor current value equals or exceeds a maximum instantaneous threshold during the transient phase.

2. The current limit circuit of claim 1, wherein average inductor current value is regulated in steady-state regulation approximately at the steady-state threshold for a duration that is a function of the over-current condition.

3. The current limit circuit of claim 1, wherein the steady-state current limit circuit is configured to adjust the adjustable filtered signal.

4. The current limit circuit of claim 3, wherein the steady-state current limit circuit reduces average inductor current value by reducing a magnitude of the adjustable filtered signal.

5. The current limit circuit of claim 1, wherein the steady-state threshold is user-programmable.

6. The current limit circuit of claim 5, wherein the steady-state threshold is user-programmable by a programming resistor.

7. The current limit circuit of claim 1, wherein the maximum instantaneous threshold is user-programmable.

8. The current limit circuit of claim 1, wherein the steady-state current limit circuit senses a signal indicative of instantaneous inductor current value when the at least one switch element is conducting current.

9. The current limit circuit of claim 8, wherein the steady-state current limit circuit is configured to sense the signal indicative of instantaneous inductor current value when the instantaneous inductor current value is decreasing.

10. The current limit circuit of claim 1, wherein the cycle-by-cycle current limit circuit senses a signal indicative of instantaneous inductor current value when the at least one switch element is conducting current.

11. The current limit circuit of claim 10, wherein the cycle-by-cycle current limit circuit is configured to sense the signal indicative of instantaneous inductor current value when the instantaneous inductor current value is decreasing.

12. The current limit circuit of claim 1, wherein the steady-state current limit circuit reduces average inductor current value by reducing the duty cycle.

13. The current limit circuit of claim 1, wherein the cycle-by-cycle current limit circuit commands escalation of instantaneous inductor current value after the instantaneous inductor-current value decreases to a minimum instantaneous threshold during the transient phase.

14. The current limit circuit of claim 13, wherein the maximum and minimum instantaneous thresholds are set relative to the steady-state threshold so that average inductor current value during the transient phase is greater than the steady-state threshold.

15. The current limit circuit of claim 13, wherein the minimum instantaneous threshold is greater than the steady-state threshold.

16. The current limit circuit of claim 1, wherein the maximum instantaneous threshold is greater than the steady-state threshold.

17. The current limit circuit of claim 1, wherein the cycle-by-cycle current limit circuit comprises a hysteretic comparator.

18. A current limit circuit for protecting a power converter that delivers output current to a load, the current limit circuit coupled to (1) an inductor through which inductor current flows, the inductor current having instantaneous and average inductor current values; (2) a switch having at least one switch element and a duty cycle; and (3) a filtering component having an adjustable filtered signal, the current limit circuit comprising:

a steady-state current limit circuit that reduces output current to a steady-state threshold during a transient phase and regulates output current approximately at the steady-state threshold responsive to an over-current condition; and a cycle-by-cycle current limit circuit that commands reduction of instantaneous inductor current value after the instantaneous inductor current value equals or exceeds a maximum instantaneous threshold during the transient phase.

19. A current limit circuit for protecting a power converter, the current limit circuit coupled to (1) an inductor through which inductor current flows, the inductor current having instantaneous and average inductor current values; (2) a switch having at least one switch element and a duty cycle; and (3) a filtering component having an adjustable filtered signal, the current limit circuit comprising:

an amplifier that generates a control signal that commands reduction of average inductor current value to a steady-state threshold during a transient phase and regulation of average inductor current value approximately at the steady-state threshold responsive to an over-current condition; and a cycle-by-cycle comparator that commands reduction of instantaneous inductor current value after the instantaneous inductor current value equals or exceeds a maximum instantaneous threshold during the transient phase.

20. A current limit circuit for protecting a power converter, the current limit circuit coupled to (1) an inductor through which inductor current flows, the inductor current having instantaneous and average inductor current values, and (2) a switch having at least one switch element and a duty cycle, the current limit circuit comprising:

a filtering component having an adjustable filtered signal;

an amplifier that adjusts the stored energy during an adjustment period responsive to average inductor current value being greater than a steady-state threshold; and a cycle-by-cycle comparator that commands reduction of instantaneous inductor current value after the instantaneous inductor current value equals or exceeds a maximum instantaneous threshold during at least part of the adjustment period.

21. A power converter comprising:

an inductor through which instantaneous inductor current flows;

a switch having at least first and second active switch elements, the first active switch element configured to be turned ON to conduct increasing instantaneous inductor current, the second active switch element configured to be turned ON to conduct decreasing instantaneous inductor current; and a comparator coupled to the second active switch element to sense a signal indicative of instantaneous inductor current during at least a portion of the time the second active switch element is ON, the comparator configured to command the second active switch element to be kept ON for a duration after instantaneous inductor current exceeds a maximum instantaneous threshold, the duration being a function of a period of time in which instantaneous inductor current compares in a predetermined manner to a minimum instantaneous threshold.

22. The power converter of claim 21, wherein the comparator is a hysteretic comparator that compares the signal indicative of instantaneous inductor current to signals corresponding to the maximum and minimum instantaneous thresholds.

23. The power converter of claim 21, further comprising a second comparator that compares the signal indicative of instantaneous inductor current to a signal corresponding to the minimum instantaneous threshold.

24. A method for limiting current in a power converter, the power converter having (1) an inductor through which inductor current flows, the inductor current having instantaneous and average inductor current values; (2) a filtering component having an adjustable filtered signal; and (3) a switch having at least one switch element and a duty cycle, the method comprising:
  reducing average inductor current value to a steady-state threshold during a transient phase responsive to an over-current condition;
  regulating average inductor current value approximately at the steady-state threshold; and
  reducing instantaneous inductor current value after the instantaneous inductor current value equals or exceeds a maximum instantaneous threshold during the transient phase.

25. The method of claim 24, wherein regulating average inductor current value approximately at the steady-state threshold comprises regulating average inductor current value approximately at the steady-state threshold for a duration that is a function of load current demand.

26. The method of claim 24, wherein reducing average inductor current value to a steady-state threshold comprises adjusting the adjustable filtered signal.

27. The method of claim 26, wherein adjusting the adjustable filtered signal comprises sinking current.

28. The method of claim 26, wherein adjusting the adjustable filtered signal comprises sourcing current.

29. The method of claim 26, wherein regulating average inductor current value comprises regulating the adjustable filtered signal approximately at a level indicative of the steady-state threshold.

30. The method of claim 24, further comprising user-programming the steady-state threshold.

31. The method of claim 30, wherein user-programming the steady-state threshold comprises selecting a programming resistance.

32. The method of claim 24, further comprising user-programming the maximum instantaneous threshold.

33. The method of claim 24, further comprising sensing a signal indicative of instantaneous inductor current value when the at least one switch element is conducting current.

34. The method of claim 33, wherein sensing a signal indicative of instantaneous inductor current value comprises sensing a signal indicative of instantaneous inductor current value when the instantaneous inductor current value is decreasing.

35. The method of claim 24, wherein reducing average inductor current value comprises reducing the duty cycle.

36. The method of claim 24, further comprising increasing instantaneous inductor current value after the instantaneous inductor current value decreases to a minimum instantaneous threshold during the transient phase.

37. The method of claim 36, wherein the maximum and minimum instantaneous thresholds are set relative to the steady-state threshold so that average inductor current value during the transient phase is greater than or equal to the steady-state threshold.

38. A method for limiting current in a power converter that delivers output current to a load, the power converter having (1) an inductor through which inductor current flows, the inductor current having instantaneous and average inductor current values; (2) a filtering component having an adjustable filtered signal; and (3) a switch having at least one switch element and a duty cycle, the method comprising:
  reducing output current to a steady-state threshold during a transient phase responsive to an over-current condition;
  regulating output current approximately at the steady-state threshold; and
  reducing instantaneous inductor current value after the instantaneous inductor current value equals or exceeds a maximum instantaneous threshold during the transient phase.

39. A method for limiting current in a power converter, the power converter having (1) an inductor through which inductor current flows, the inductor current having instantaneous and average inductor current values; (2) a filtering component having an adjustable filtered signal; and (3) a switch having at least one switch element and a duty cycle, the method comprising:
  providing the adjustable filtered signal;
  adjusting the adjustable filtered signal to reduce average inductor current value to a steady-state threshold during a transient phase responsive to an over-current condition;
  regulating the adjustable filtered signal approximately at a level indicative of the steady-state threshold to regulate average inductor current value approximately at the steady-state threshold; and
  reducing instantaneous inductor current value after the instantaneous inductor current value equals or exceeds a maximum instantaneous threshold during the transient phase.

40. A method for limiting current in a power converter, the power converter having (1) an inductor through which instantaneous inductor current flows; (2) a switch having at least first and second active switch elements, the first active switch element configured to be turned ON to conduct increasing instantaneous inductor current and the second active switch element configured to be turned ON to conduct decreasing inductor current; and (3) a first comparator, the method comprising:
  sensing a signal indicative of instantaneous inductor current from the second active switch element during at least a portion of the time the second active switch element is ON;
  comparing instantaneous inductor current to a maximum instantaneous threshold;
  commanding the second active switch element to be kept ON for a duration after instantaneous inductor current exceeds the maximum instantaneous threshold; and
  comparing instantaneous inductor current to a minimum instantaneous threshold in a predetermined manner for a period of time, the duration being a function of the period of time.

41. The method of claim 40, wherein comparing instantaneous inductor current to maximum and minimum instantaneous thresholds comprises using the first comparator to compare the signal indicative of instantaneous inductor current to respective signals corresponding to the maximum and minimum instantaneous thresholds.

42. The method of claim 40, wherein the power converter further comprises a second comparator and comparing instantaneous inductor current to a minimum instantaneous threshold comprises using the second comparator to compare the signal indicative of instantaneous inductor current to a signal corresponding to the minimum instantaneous threshold.

* * * * *